(12) United States Patent
Futaki et al.

(10) Patent No.: US 10,791,513 B2
(45) Date of Patent: Sep. 29, 2020

(54) INTER BASE STATION HANDOVER METHOD, RADIO COMMUNICATION SYSTEM, DRX CONTROL METHOD, BASE STATION, AND COMMUNICATION TERMINAL

(71) Applicants: Hisashi Futaki, Tokyo (JP); Jinsock Lee, Tokyo (JP)

(72) Inventors: Hisashi Futaki, Tokyo (JP); Jinsock Lee, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 0 days.

(21) Appl. No.: 16/398,881

(22) Filed: Apr. 30, 2019

(65) Prior Publication Data

US 2019/0261271 A1    Aug. 22, 2019

Related U.S. Application Data

(63) Continuation of application No. 15/698,729, filed on Sep. 8, 2017, now Pat. No. 10,356,715, which is a (Continued)

(30) Foreign Application Priority Data

Feb. 5, 2007    (JP) .................... 2007-025873

(51) Int. Cl.
*H04W 52/02* (2009.01)
*H04W 76/28* (2018.01)
(Continued)

(52) U.S. Cl.
CPC ... *H04W 52/0212* (2013.01); *H04W 36/0005* (2013.01); *H04W 36/0055* (2013.01);
(Continued)

(58) Field of Classification Search
None
See application file for complete search history.

(56) References Cited

U.S. PATENT DOCUMENTS 5,910,944 A    6/1999 Callicotte et al.
6,490,268 B1   12/2002 Lee et al.
(Continued)

FOREIGN PATENT DOCUMENTS

CN    1406084 A    3/2003
CN    1820426 A    8/2006
(Continued)

OTHER PUBLICATIONS

Samsung, "Discussion on LTE fast dormancy", 3GPP TSG-RAN#71bis, 7.6, R2-105407, Xian, China, Oct. 11-15, 2010 (5 pages total).
(Continued)

*Primary Examiner* — Hong S Cho
(74) *Attorney, Agent, or Firm* — Sughrue Mion, PLLC

(57) ABSTRACT

A DRX control method and system includes receiving, from a source base station for transferring the UE from the source base station to a target base station, a plurality of configurations including: a first configuration of a first Discontinuous Reception (DRX) cycle, a second configuration of a second DRX cycle, and a first timer counting a period in the first DRX cycle to shift from the first DRX cycle to the second DRX cycle; performing, in a state of RRC Radio Resource Control (RRC) connected with the target base station, DRX operation with the first DRX cycle; and performing, in a state of RRC connected with the target base station, the DRX operation with the second DRX cycle when the UE does not receive data from the target base station until the first timer expires in the first DRX cycle.

26 Claims, 19 Drawing Sheets

Related U.S. Application Data continuation of application No. 14/692,076, filed on Apr. 21, 2015, now Pat. No. 9,788,271, which is a continuation of application No. 13/671,707, filed on Nov. 8, 2012, now Pat. No. 9,060,370, which is a continuation of application No. 12/525,950, filed as application No. PCT/JP2008/051690 on Feb. 1, 2008, now Pat. No. 8,626,167.

(51) Int. Cl.
| | |
|---|---|
| H04W 36/00 | (2009.01) |
| H04W 36/16 | (2009.01) |
| H04W 36/08 | (2009.01) |
| H04W 76/20 | (2018.01) |

(52) U.S. Cl.
CPC ......... *H04W 36/08* (2013.01); *H04W 36/165* (2013.01); *H04W 52/02* (2013.01); *H04W 52/0216* (2013.01); *H04W 76/28* (2018.02); *H04W 76/20* (2018.02); *Y02D 70/1262* (2018.01); *Y02D 70/142* (2018.01); *Y02D 70/146* (2018.01); *Y02D 70/24* (2018.01)

(56) References Cited

U.S. PATENT DOCUMENTS

| | | | |
|---|---|---|---|
| 6,950,415 | B2 | 9/2005 | Chang et al. |
| 7,366,124 | B2 | 4/2008 | Lee et al. |
| 7,761,122 | B2 | 7/2010 | Homchaudhuri |
| 7,916,675 | B2 | 3/2011 | Dalsgaard et al. |
| 7,957,360 | B2 | 6/2011 | Suzuki et al. |
| 7,986,949 | B2 | 7/2011 | Ryu et al. |
| 8,027,373 | B2* | 9/2011 | Subrahmanya ...... H04B 1/7085 375/149 |
| 8,095,134 | B2* | 1/2012 | Huang ...................... H04L 1/20 370/331 |
| 8,818,321 | B2 | 8/2014 | Dalsgaard et al. |
| 9,301,215 | B2* | 3/2016 | Sebire ............... H04W 36/0055 |
| 2002/0006805 | A1 | 1/2002 | New et al. |
| 2003/0050078 | A1 | 3/2003 | Motegi et al. |
| 2003/0050097 | A1 | 3/2003 | Amirijoo et al. |
| 2004/0063430 | A1* | 4/2004 | Cave ..................... H04W 36/30 455/436 |
| 2004/0063431 | A1 | 4/2004 | Julka et al. |
| 2004/0227618 | A1 | 11/2004 | Hwang et al. |
| 2005/0020271 | A1 | 1/2005 | Fukuda et al. |
| 2005/0032555 | A1 | 2/2005 | Jami et al. |
| 2005/0075148 | A1 | 4/2005 | Park |
| 2005/0143107 | A1 | 6/2005 | Pattar et al. |
| 2006/0068789 | A1 | 3/2006 | Vannithamby et al. |
| 2006/0084408 | A1 | 4/2006 | Wan |
| 2006/0262739 | A1* | 11/2006 | Ramirez ............... H04W 88/06 370/311 |
| 2007/0167165 | A1 | 7/2007 | Yang et al. |
| 2007/0238463 | A1 | 10/2007 | Ogami |
| 2007/0291695 | A1* | 12/2007 | Sammour ............. H04W 36/02 370/331 |
| 2007/0291729 | A1* | 12/2007 | Dalsgaard ......... H04W 52/0229 370/347 |
| 2008/0096557 | A1* | 4/2008 | Rinne ...................... H04W 8/26 455/435.1 |
| 2008/0130580 | A1* | 6/2008 | Chaponniere ..... H04W 36/0011 370/331 |
| 2008/0167089 | A1 | 7/2008 | Suzuki et al. |
| 2009/0017854 | A1 | 1/2009 | Arimitsu |
| 2009/0253470 | A1 | 10/2009 | Xu |
| 2009/0268689 | A1* | 10/2009 | Fu ........................ H04W 76/28 370/331 |
| 2011/0003600 | A2 | 1/2011 | Beckmann et al. |
| 2013/0329637 | A1* | 12/2013 | Kodali ................. H04W 76/27 370/328 |

FOREIGN PATENT DOCUMENTS

| | | | |
|---|---|---|---|
| EP | 1107626 | A2 | 6/2001 |
| EP | 1499144 | A1 | 1/2005 |
| JP | 5-55994 | A | 3/1993 |
| JP | 7-322332 | A | 12/1995 |
| JP | 8-340569 | A | 12/1996 |
| JP | 9-508773 | A | 9/1997 |
| JP | 09-331288 | A | 12/1997 |
| JP | 10-136424 | A | 5/1998 |
| JP | 2004-023520 | A | 1/2004 |
| JP | 2004-504783 | A | 2/2004 |
| JP | 2004159334 | A | 6/2004 |
| JP | 2005-80312 | A | 3/2005 |
| JP | 2007536789 | A | 12/2007 |
| JP | 2013-9412 | A | 1/2013 |
| JP | 5472403 | B2 | 4/2014 |
| KR | 10-0510642 | B1 | 8/2005 |
| KR | 10-2007-0024302 | A | 3/2007 |
| RU | 2 201 655 | C2 | 12/1999 |
| WO | 95/32594 | A1 | 11/1995 |
| WO | 2005/022780 | A1 | 3/2005 |
| WO | 2005107377 | A2 | 11/2005 |
| WO | 2006011775 | A2 | 2/2006 |
| WO | 2006018670 | A1 | 2/2006 |
| WO | 2006095797 | A1 | 9/2006 |
| WO | 2006118490 | A1 | 11/2006 |

OTHER PUBLICATIONS

Office Action dated May 28, 2019 in corresponding Japanese Application No. 2018-166666.
3GPP RAN WG2[R2-070088 Summary of email discussion on DRX in LTE_ACTIVE] ,<Internet URL http://www.3gpp.org/ftp/tsg_ran/WG2_RL2/TSGR2_56bis/Documents/R2-070088.zip> Apr. 2019.
3GPP TSG-RAN2 Meeting #56 Riga, Lativa, Nov. 6, 2006-Nov. 10, 2006, Fast Setup for PS Services (Cell PCH & URA PCH).
3GPP TS 25.331 (Jun. 2006), 1,245 total pages.
Communication dated Oct. 14, 2014 from The Japanese Patent Office in counterpart Japanese patent Application No. 2014021553.
Communication, dated Apr. 3, 2013, issued by the Federal Service for Intellectual Property, Patents, and Trade Marks in counterpart Russian Patent Application No. 2012113731/07.
Extended European Search Report dated Mar. 1, 2013 issued by the European Patent Office in counterpart European Application No. 12193542.3.
Japanese Office Action dated Sep. 4, 2012 for corresponding Japanese patent application No. 2011-177375.
"Introduction of Continuous Packet Connectivity in RNSAP", Nokia, Qualcomm Europe, Ericsson, ZTE, RAN WG3, 3GPP TSG-RAN WG3 Meeting #54, Riga, Latvia, Nov. 6-10, 2006, R3-061799, 38 total pages.
Nokia, "Active Mode DRX," 3GPP TSG-RAN WG2 Meeting #55, Oct. 9-13, 2006, Seoul, Korea, 3 pages (R2-062752).
Office Action, dated Dec. 20, 2012, issued by the Russian Federal Service for Intellectual Property in counterpart Russian Patent Application No. 2011140122/07.
Communication dated Apr. 17, 2018, from the Japanese Patent Office in counterpart application No. 2017-077275.
3GPP TSG-RAN2 Meeting #56bis; RRC Connection Control for Inactive but connected UEs, Apr. 2019.
"3rd Generation Partnership Project; Technical Specification Group Radio Access Network; UTRAN Iur interface RNSAP signaling (Release 7)", 3GPP TS 25.423, (Sep. 2006), 755 total pags.
3GPP TS36.300 v0.3.1, Nov. 2006.
3GPP-TSG-RAN3 Meeting #55, Use of AS-configuration upon handover and connection establishment; Tdoc R2-062904, Apr. 2019.
Communication dated Sep. 15, 2015 from the Japanese Patent Office in counterpart application No. 2014-244977.
Communication, dated May 22, 2013, issued by the Federal Service for Intellectual Property, Patents, and Trademarks in counterpart Russian Patent Application No. 2011140122/07.

(56) References Cited

OTHER PUBLICATIONS

Japanese Office Action dated May 29, 2012 in corresponding Japanese Application No. 2011-112557.
LG Electronics, "DRX Scheme," 3GPP TSG-RAN WG2 #56bis, Jan. 15-19, 2007, Sorrento, Italy, pp. 1-4 (R2-070265).
Notice of Submission of Opinion dated Aug. 7, 2011 from the Korean Intellectual Property Office in counterpart Korean application No. 10-2011-7011098.
Office Action, dated Dec. 21, 2012, issued by the Russian Federal Service for Intellectual Property in counterpart Russian Patent Application No. 2011140121/07.
Communication dated Jun. 5, 2018, from the Japanese Patent Office in counterpart Appeal No. 2017-5067.
3GPP TS 36.300, Vo. 4.0, (Jan. 2007), Release 8, pp. 8-72.
3GPP TSG-RAN3 Meeting #53 bis, AS Configuration and Its Use; Tdoc R2-061831 May 8, 2006.
Communication dated Sep. 12, 2014, issued by the United States Patent and Trademark Office in counterpart Application No. 13671707.
Communication, dated May 22, 2013, issued by the Federal Service for Intellectual Property, Patents, and Trademarks in counterpart Russian Patent Application No. 2011140121/07.
Japanese Office Action dated Nov. 15, 2011 in corresponding Japanese Patent Application No. 2008-557090.
LG Electronics, "DRX Scheme," 3GPP TSG-RAN WG2 #56bis, Jan. 15-19, 2007, Sorrento, Italy, pp. 1-4.
Notice of Grounds for Rejection dated Sep. 13, 2011 by the Japanese Patent Office in counterpart Japanese Patent Application No. 2008557090.
Research in Motion Limited, Supporting Long DRX in LTE_ACTIVE for Non-Realtime Traffic, 3GPP TSG-RAN93 WG2#56bis R2-070101, 3GPP, Jan. 15-18, 2007 (4 pages total).
3GPP TSG-RAN2 Meeting #56; Use of AS-configuration upon handover and connection establishment; Tdoc R2-063179, Apr. 2019.
3GPP TSG RAN WG2 #52, MAC states in LTE_ACTIVE; Tdoc R2-060844, Apr. 2019.
Communication dated Aug. 4, 2015 from the State Intellectual Property Office of People's Republic of China in counterpart Application No. 201210195871.4.
Communication dated Sep. 6, 2016, from the Japanese Patent Office in counterpart Japanese application No. 2016-000629.
Extended European Search Report dated Feb. 22, 2013 issued by the European Patent Office in counterpart European Application No. 08710722.3.
Japanese Office Action dated Jun. 26, 2012 for corresponding Japanese patent application No. 2011-112556.
NEC, "Fast setup for PS services (Cell PCh & URA PCH)", Discussion & Decision, 3GPP TSg-RAN2 Meeting #56, Nov. 6-Nov. 10, 2006, R2-063413, pp. 2-10/E (9 pages total).
Panasonic, "DRX and DTC Operation in LTE_Active," 3GPP TSG-RAN WG2 Meeting #52, Mar. 27-31, 2006, Athena, Greece, pp. 1-3.
"Introduction of DTX-DRX and HS-SCCH less in RRC", QUALCOMM Europe, Nokia, Ericsson, Philips, 96. 3GPP TSG-RAN WG2 Meeting #56, Riga, Latvia, Nov. 6-10, 2006, R2-063309, 114 total pages.

* cited by examiner

FIG. 7

| MOBILE STATION MOVEMENT SPEED | CELL DIAMETER | NO. OF HO OPERATIONS | CELL RESIDENCE TIME | DRX RESIDENCE PERIOD IN CONVENTIONAL METHOD | DRX RESIDENCE PERIOD IN PRESENT INVENTION | INCREASE/DECREASE IN DRX RESIDENCE PERIOD ACCORDING TO PRESENT INVENTION |
|---|---|---|---|---|---|---|
| 120 km/h | 12 km | 4 times | 6 minutes | (4+1)×(6-1)=25 minutes | (6-1)+4×6=29 minutes | +4 minutes |
| 60 km/h | 10 km | twice | 10 minutes | (2+1)×(10-1) = 27 minutes | (10-1)+2×10= 29 minutes | +2 minutes |
| 60 km/h | 5 km | 5 times | 5 minutes | (5+1)×(5-1)=24 minutes | (5-1)+5×5=29 minutes | +5 minutes |
| 60 km/h | 3 km | 9 times | 3 minutes | (9+1)×(3-1)=20 minutes | (3-1)+9×3=29 minutes | +9 minutes |
| 60 km/h | 1 km | 29 times | 60 seconds | (29+1)×(1-1)= 0 minute | (1-1)+29×1 = 29 minutes | +29 minutes |
| 3 km/h | 1 km | 15 times | 20 minutes | (1.5+0)×(20-1) =28.5 minutes | (20-1)+0.5×20= 29 minutes | +0.5 minutes |

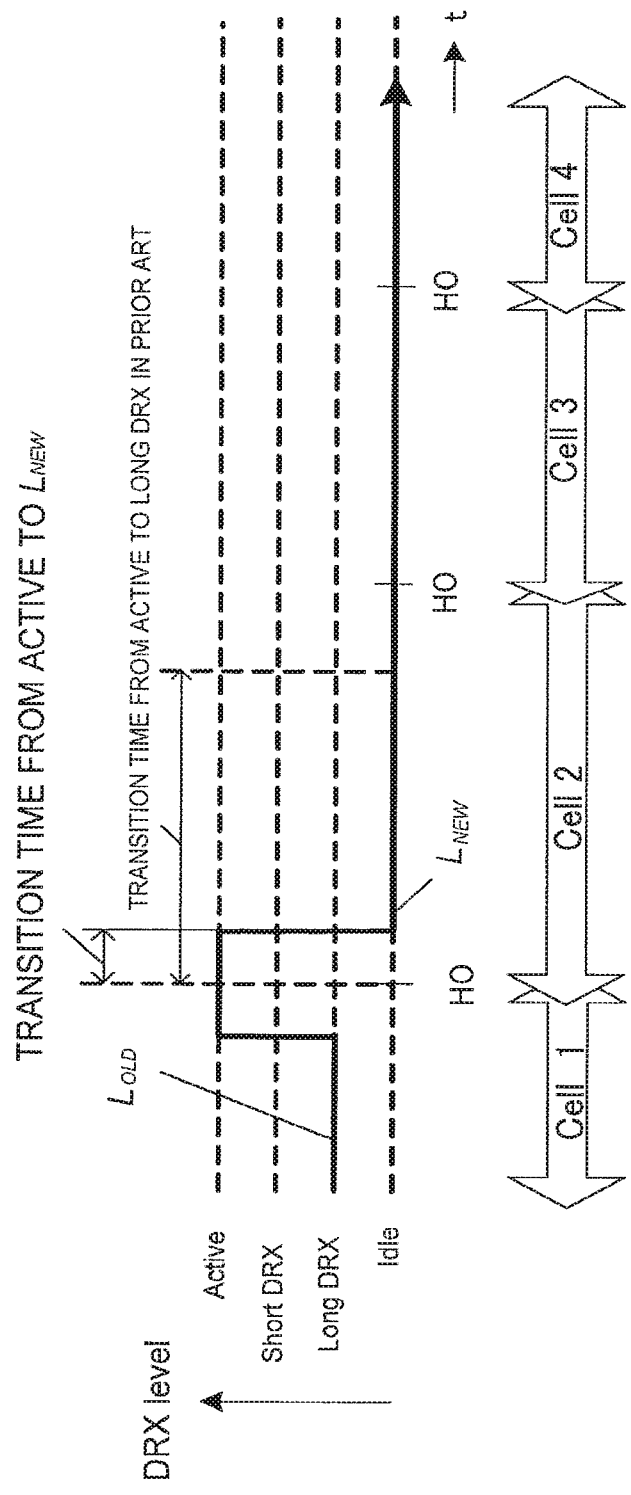

FIG. 9

| MOBILE STATION MOVEMENT SPEED | CELL DIAMETER | CELL RESIDENCE TIME | NO. OF HO OPERATIONS IN PRIOR ART | NO. OF HO OPERATIONS IN PRESENT INVENTION | INCREASE/DECREASE IN NUMBER OF HO OPERATIONS ACCORDING TO PRESENT INVENTION |
|---|---|---|---|---|---|
| 120 km/h | 12 km | 6 minutes | once | once | 0 time |
| 60 km/h | 10 km | 10 minutes | once | once | 0 time |
| 60 km/h | 5 km | 5 minutes | 4 times | once | −3 times |
| 60 km/h | 3 km | 3 minutes | 9 times | twice | −7 times |
| 60 km/h | 1 km | 60 seconds | 29 times | 5 times | −24 times |
| 3 km/h | 1 km | 20 minutes | once | once | 0 time |

FIG. 13

| MOBILE STATION MOVEMENT SPEED | CELL DIAMETER | NO. OF HO OPERATIONS | CELL RESIDENCE TIME | DRX RESIDENCE TIME |
|---|---|---|---|---|
| 120 km/h | 12 km | 4 times | 6 minutes | (4+1) × (6−1) = 25 minutes |
| 60 km/h | 10 km | twice | 10 minutes | (2 + 1) × (10 − 1) = 27 minutes |
| 60 km/h | 5 km | 5 times | 5 minutes | (5+1) × (5−1) = 24 minutes |
| 60 km/h | 3 km | 9 times | 3 minutes | (9+1) × (3−1) = 20 minutes |
| 60 km/h | 1 km | 29 times | 60 seconds | (29+1) × (1−1) = 0 minute |
| 3 km/h | 1 km | 15 times | 20 minutes | (1.5 + 0) × (20 − 1) = 28.5 minutes |

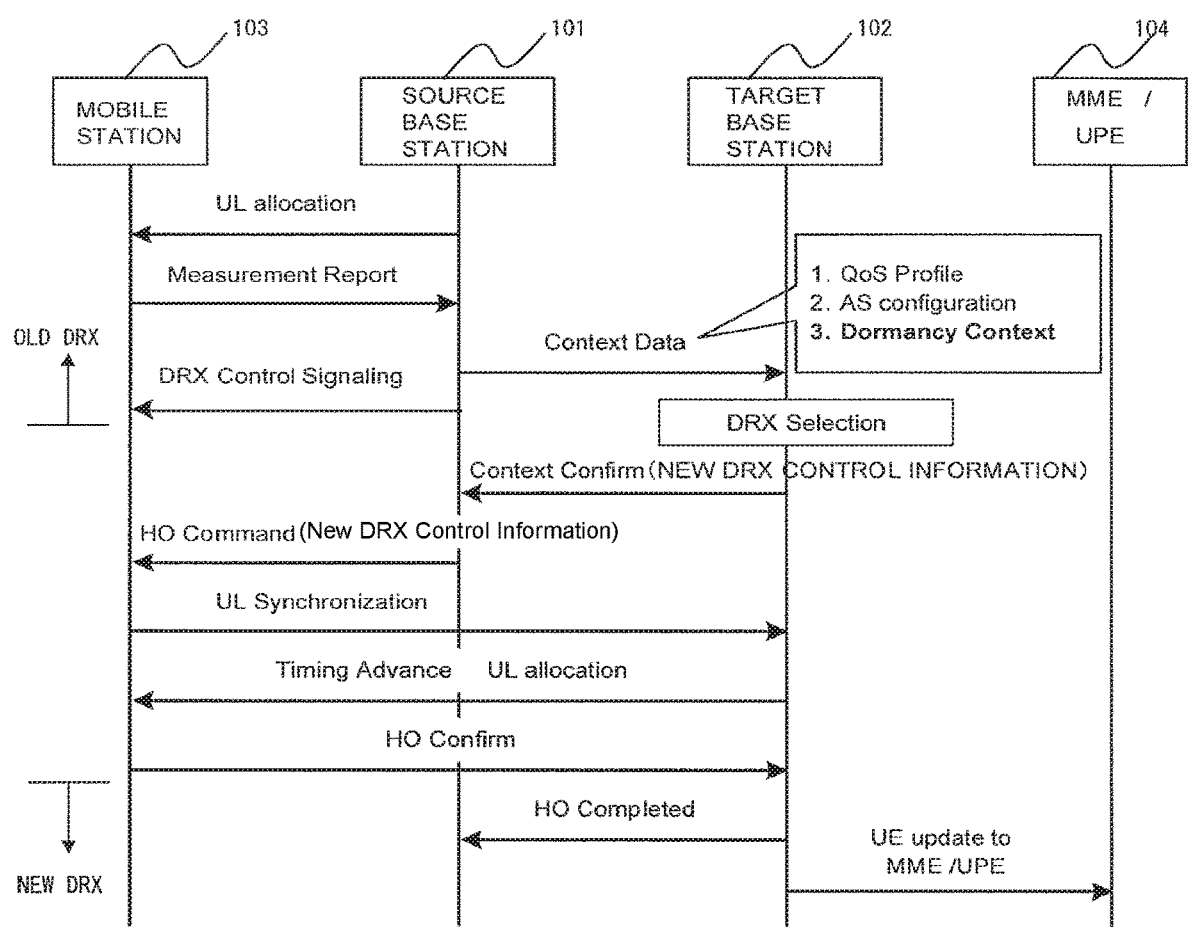

INTER BASE STATION HANDOVER METHOD, RADIO COMMUNICATION SYSTEM, DRX CONTROL METHOD, BASE STATION, AND COMMUNICATION TERMINAL

CROSS-REFERENCE TO RELATED APPLICATIONS

This application is a Continuation Application of U.S. application Ser. No. 15/698,729 filed Sep. 8, 2017, which is a Continuation Application of Ser. No. 14/692,076, filed Apr. 21, 2015, issued as U.S. Pat. No. 9,788,271, which is a Continuation Application of U.S. application Ser. No. 13/671,707, issued as U.S. Pat. No. 9,060,370, filed Nov. 8, 2012, which is a Continuation of U.S. application Ser. No. 12/525,950 filed Aug. 5, 2009, issued as U.S. Pat. No. 8,626,167, which is a 371 of International application PCT/JP2008/051690 filed Feb. 1, 2008, which claims priority from Japanese patent application 2007-025873 filed on Feb. 5, 2007, the disclosures of which are incorporated herein by reference in their entirety.

TECHNICAL FIELD

The present invention relates to a radio communication system, and more particularly to a radio communication system and method that performs an inter base station handover from a source base station to a target base station.

BACKGROUND ART

In 3GPP (3rd Generation Partnership Project) Long Term Evolution (LTE), study is being conducted that the following information (RAN(Radio Access Network) Context Data), which is the information concerning a mobile station that performs inter base station handover, is transferred from a source base station (source eNB) to a target base station (target eNB), when the mobile station performs inter base station handover (abbreviated "HO"). (For example, see non-Patent Document 1).

1. Qos profiles (QoS profiles of the SAE (System Architecture Evolution) bearers)
2. AS configuration (RLC(Radio Link Control) Window Size, etc.)

In addition, when the source base station is transmitting downlink data, the source base station performs data forwarding which transfers unsent data to the target base station.

The mobile station that has moved to the target cell accesses the target base station via Random Access Channel (RACH), which is an uplink channel, to acquire Timing Advance (TA), provided for uplink synchronization, and uplink scheduling information from the target base station. After that, the mobile station adjusts transmission timing according to the acquired TA and transmits "HO Confirm", which is a control signal for notifying that the mobile station has performed handover to the target base station, at allocated time and frequency.

In LTE, study is being conducted also on DRX (Discontinuous Reception: intermittent reception) control of a mobile station in the RRC(Radio Resource Control) Connected state (see Non-Patent Document 1).

A base station performs DRX control of entire mobile stations in a cell that the base station manages, and a mobile station performs the discontinuous reception at a periodic interval (also called "DRX cycle" or "DRX period") specified by the base station. A DRX cycle (DRX period) includes a reception period during which data is continuously received and a non-reception period during which no data is received, as shown in FIG. 18.

Non-Patent Document 1:
3GPP TS36.300 v0.3.1 (Section 10.1, etc.)
Non-Patent Document 2:
3GPP RAN WG2[R2-070088 Summary of email discussion on DRX in LTE_ACTIVE],<Internet URL http://www.3gpp.org/ftp/tsg_ran/WG2_RL2/TSGR2_56bis/Documents/R2-070088.zip>

DISCLOSURE OF THE INVENTION

Problems to be Solved by the Invention

The disclosure of Non-Patent Documents 1 and 2 given above is hereby incorporated by reference into this specification. The following gives an analysis of the technology related to the present invention.

Today, study has just begun on how to combine the LTE-proposed inter base station HO control and the DRX control. And so, little study has been made on a practical method for power saving on a mobile station when those controls are combined.

Therefore, in view of the problems described above, it is an object of the present invention to provide a method, system, base station, and communication terminal for saving power of a mobile station when handover control and DRX control are combined.

Therefore, it is another object of the present invention to provide a method, system, base station, and communication terminal for enabling suppression of an increase or reduction in a load of a network side involved in handover control.

Means to Solve the Problems

To solve one or more the problems of the described above, the invention disclosed by this application provides an inter base station handover (HO) method and a radio communication system, which implements the method, that have the following general configuration.

In an inter base station handover method and a radio communication system of the present invention, a source base station (source eNB) forwards Dormancy Context to a target base station (target eBN) during handover to optimize the continuation of DRX control before and after handover.

After a mobile station has completed handover, the target base station (target eBN) uses the Dormancy Context to perform DRX control of the mobile station.

If the mobile station (User Equipment: UE) has stayed in a long DRX cycle in the source cell, the target base station (target eBN) may use the Dormancy Context also for the processing for moving the state of the mobile station (UE) to LTE_Idle.

In the present invention, at least one of the following is included in the Dormancy Context.

a DRX (Discontinuous Reception) level at the current time (when a HO request is generated), a time during which a mobile station has stayed in the current DRX level, an average DRX level during management by the source base station, a maximum DRX level during management by the source base station, a minimum DRX level during management by the source base station, a transmission buffer size in the HO preparation period, and a scheduling time in the source base station/RRC_Connected state time in the source base station A source base station and a target base station in the present invention may be base stations not only in the same communication system but also in different systems.

Effect of the Invention

According to the present invention, it is possible to optimize the continuation of DRX control before and after handover. For example, the present invention allows a low activity mobile station to start DRX control more quickly. As a result, the reduction of the power consumption of the mobile station can be achieved.

The present invention also allows a low activity mobile station to transit to an Idle state more quickly. As a result, the reduction of the power consumption of the mobile station can be achieved. In addition, in the present invention, it is possible to avoid inter base station HO which is not actually necessary, thus avoiding an increase in the load of a network.

BRIEF DESCRIPTION OF THE DRAWINGS

FIG. 7 is a diagram for explaining the effect of power saving of a mobile station in the first exemplary embodiment of the present invention.

FIG. 8 is a diagram for explaining activity level control of a mobile station in a second exemplary embodiment of the present invention.

FIG. 9 is a diagram for explaining the effect of power saving of a mobile station and the effect of reduction in the load of a NW in the second exemplary embodiment of the present invention.

FIG. 13 is a diagram for explaining an operation of a mobile station in an example.

FIG. 19 is a diagram for explaining a flow of inter base station handover in a modification of one exemplary embodiment of the present invention.

Figure 1:
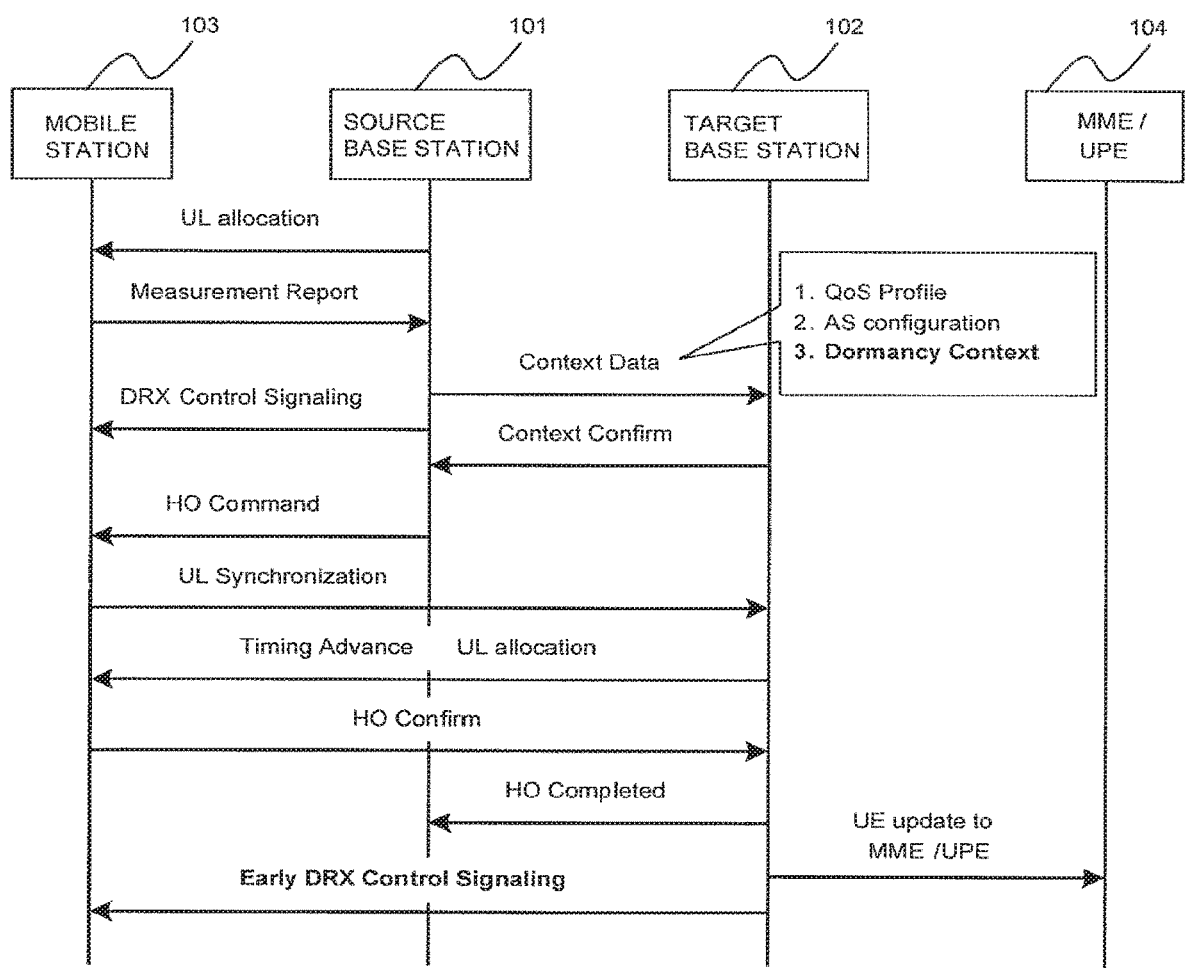
FIG. 1 is a diagram for explaining a flow of inter base station handover in one exemplary embodiment of the present invention.

EXPLANATIONS OF SYMBOLS 1,2 LTE base station
4 Base station control station
5 WCDMA base station
101 Source base station
102 Target base station
3,103 Mobile station
41,42 Transmission/reception interface
43 Control unit
44 Dormancy control relay unit
104 MME/UPE
105 Radio unit
106 Baseband unit
107,112 Coding/decoding unit
108 Control unit
108-1 Scheduler
108-2 Controller
109 Transmission/reception unit
110 DRX controller
111 Buffer
121 Radio unit
122 Baseband unit
123,127 Coding/decoding unit
124 Buffer
125 Control unit
126 Activity level controller
127 DRX level controller

PREFERRED MODES FOR CARRYING OUT THE INVENTION

To describe the present invention more in detail, exemplary embodiments of the present invention will be described below with reference to the accompanying drawings. In the exemplary embodiment below, an example in which the present invention is applied to a system proposed by 3GPP LTE is used though not limited thereto.

Figure 18:
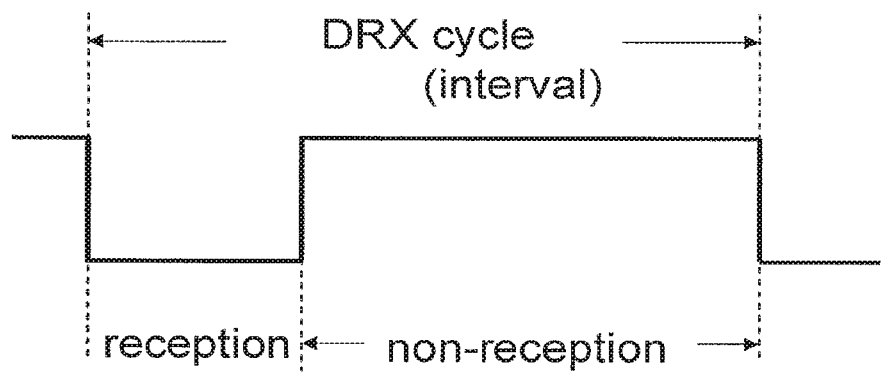
FIG. 18 is a diagram for explaining a DRX cycle.

As an example of the DRX (Discontinuous Reception) control at handover (abbreviated "HO"), a base station changes the parameters (see FIG. 18) related to a DRX cycle, such as the non-reception period, according to the data transmission/reception status (called "Activity") of a mobile station. Although a base station changes the parameters in the description below because an example of 3GPP LTE is used, the network side, for example, a 3GPP base station control apparatus (RNC: Radio Network Controller), may change the parameters. As an indicator indicating an Activity rate (degree), the indicator such as an "Activity level" may be used. As this activity level, the ratio of the time (Ts), during which data is accumulated in the transmission buffer, to a predetermined period (T) may be used ((Ts/T)×100(%) when represented in %). Note that, in the present invention, the Activity level is not limited to (Ts/

T)×100(%) but that another value (conversion value) having a correlation with (Ts/T) may also be used.

Although a practical example of "Activity" and "Activity level" was described above, the definition of "Activity" and "Activity level" in this specification is not of course limited to the above but should be understood as the general data transmission/reception status and its frequency.

A base station and a mobile station may use an indicator called "DRX level", acquired based on the Activity level, as the signal used for the DRX control. An Activity level value may be used directly as a DRX level, or a value acquired by converting an Activity level value (preferably a value having a high correlation with an Activity level value), may be used as a DRX level. A DRX level may be represented in percent (%). In this case, though a discrete value (for example, an integer value) is usually used as a value in the range of 0-100%, a continuous value such as a decimal number may of course be used. Alternatively, several discrete central values may be used as DRX levels.

First, as an example of the LTE-proposed operation in which the inter base station (inter eNB) HO and the DRX control are combined, the following describes the DRX control of a mobile station in the HO preparation period during which a sequence of the following operations are performed.

The mobile station transmits the Measurement Report to the source base station.

The source base station checks the Measurement Report to determine which base station is a candidate for the target base station, and the source base station and the target base station exchange the handover-related information indicating whether the target base station can accept the handover or not.

For example, a method is known that a mobile station, for which a long non-reception period is configured by the DRX control, ignores the currently configured DRX control and transits to the Active operation (the state in which the mobile station can continuously receive the downlink signal) and that a mobile station, for which a short non-reception period is configured, performs HO, while staying in the state in which the short non-reception period is configured (for example, see Non-Patent Document 2). However, a practical method for implementing the method described above is not shown. The following describes a practical implementation method.

Figure 11:
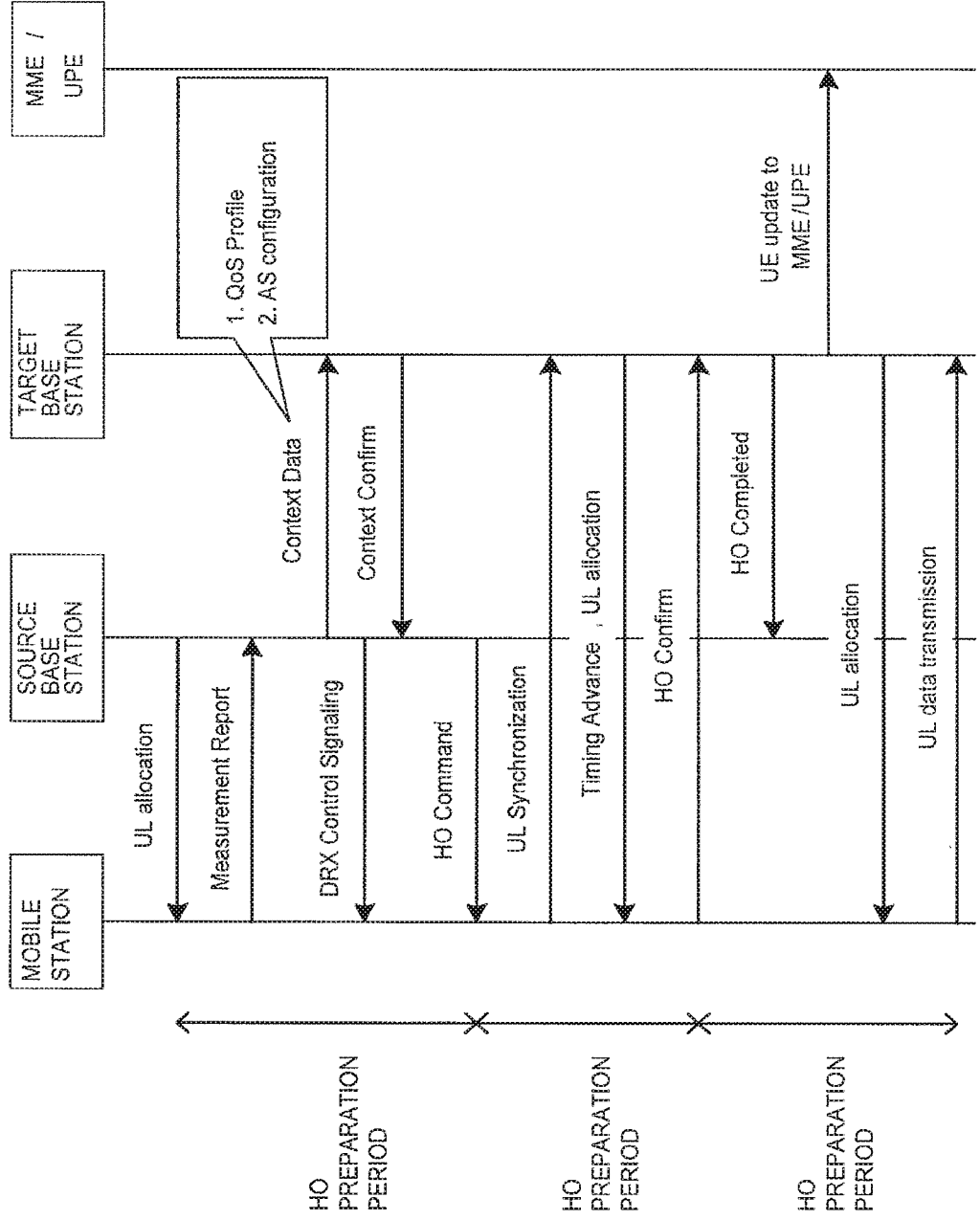
FIG. 11 is a diagram for explaining a flow of inter base station handover.

The procedure of base station HO in a mobile station under DRX control will be described with reference to FIG. 11.

Uplink scheduling information (UL allocation) is transmitted from the target base station to the mobile station. The mobile station that will perform inter base station HO transmits a Measurement Report on neighboring cells of the source cell, in which the mobile station resides, to the source base station.

The source base station transmits a signal (DRX Control Signaling), which instructs the mobile station to move from DRX (Discontinuous Reception) to the continuous reception operation (or to reduce the non-reception period of the DRX cycle), to the mobile station and stops the DRX control of the mobile station. It should be noted that, though the base station that receives the Measurement Report outputs the DRX control stop signal to the mobile station in the sequence operation example in FIG. 11, the base station that receives the Measurement Report need not always output the DRX control stop signal to the mobile station. For example, a rule may be predetermined to allow the mobile station to stop the DRX operation itself.

The source base station transfers the RAN Context Data (Qos Profile, AS configuration) on the mobile station to the target base station.

After receiving the notification (Context Confirm), which indicates that the HO can be accepted, from the target base station, the source base station transmits the command of HO start permission (HO Command) to the mobile station.

After receiving the HO start command (HO Command) from the source base station, the mobile station that has moved to the target cell transmits an uplink synchronization (UL Synchronization) request via an RACH that is an uplink channel, and acquires the transmission timing adjustment value (Timing Advance: TA) and the uplink scheduling information (UL allocation) from the target base station.

After that, the mobile station transmits HO Confirm at the allocated time and frequency, by adjusting the transmission timing according to the transmission timing adjustment value (TA) received from the target base station, to inform the target base station that the mobile station has performed handover.

The target base station, which has received the HO Confirm from the mobile station, transmits a control signal (HO Completed) to the source base station to inform that the handover has been completed, notifies the MME (Mobility Management Entity)/UPE (User Plane Entity) that the mobile station performed the inter base station HO to move to the cell which is managed by the target base station (UE (User Equipment) update to MME/UPE), and completes the inter base station HO operation. Note that, at this point of time, the mobile station is still in the Active operation.

If the mobile station that has performed handover does not transmit or receive data during a predetermined period (determined by the timer included in the target base station side) after handover, the target base station restarts DRX control for the mobile station.

The uplink scheduling information (UL allocation: time and frequency allocation information) is transmitted from the target base station to the mobile station to allow the mobile station to transmit data (UL data transmission), if necessary.

As described above, the mobile station is controlled by combining HO and DRX.

Figure 12:
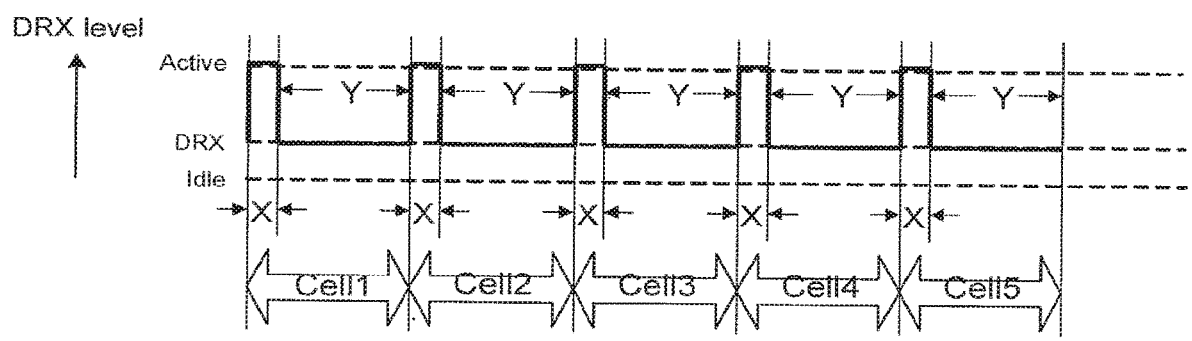
FIG. 12 is a diagram for explaining activity level control of a mobile station in an example.

FIG. 12 is a diagram for explaining the calculation of the time UE staying in DRX shown in FIG. 13, and FIG. 12 shows an example of changes in the DRX level when a mobile station in DRX control operation performs the inter base station HO. It is assumed that a mobile station moves through the center of each cell and moves the distance equal to the diameter.

In the example in FIG. 12, the state is called as follows.
"Active" when the DRX level is 100%, and
"DRX" when the DRX level is 20%.

An idle state in which the DRX level is 0% is RRC_Idle (LTE_Idle) state.

In the description below, a model proposed by 3GPP LTE is used as an example where 100% of the DRX level is 100% of the Activity Level. When one frame includes 10 TTIs (Transmission Time Intervals), a mobile station whose DRX level is 100% (that is, Active operation) monitors the downlink (DL) signal (demodulates a control channel) in each TTI. On the other hand, a mobile station whose DRX level is 20% monitors the DL signal only in the two continuous TTIs out of 10 TTIs but not in the remaining eight TTIs that are non-reception periods. It is of course possible to define a value of the DRX level smaller than 100%, for example, 90% or 95%, as "Active".

In the example in FIG. 12, cell 1 is managed by base station 1, and cells 2, 3, and 4 are managed respectively by base stations 2, 3, and 4. Also assume that the mobile station performs the data transmission/reception only for the HO operation in cells 2, 3, and 4. The change in the DRX level is indicated by the bold line.

In FIG. 12, the symbol X indicates the time during which the mobile station is Active during HO procedure and the symbol Y indicates the time during which the mobile station is under DRX control (DRX residence)

Now, assume that the mobile station is in cell 1 and is under DRX control. When performing inter base station HO to move to cell 2, the mobile station becomes Active and performs the HO operation. Because, in cell 2, the mobile station does not perform data transmission/reception immediately after the HO, the base station 2 changes the state of the mobile station from the Active to the DRX after a timeout of a timer, corresponding to the Active-to-DRX transition time, occurs. After that, the mobile station performs HO from cell 2 to cell 3, to cell 4, and then to cell 5, one after another, and, in that case, the operation is performed in the same way as when the mobile station performs HO from cell 1 to cell 2.

Assume that the mobile station transition time from Active to DRX at HO is one minute (X in FIG. 12 is one minute) and that the mobile station performs data transmission/reception intermittently for 30 minutes. Under this assumption, FIG. 13 shows in a tabular form an example of the DRX residence time in 30 minutes when the parameters, such as the movement speed and the cell diameter, are varied.

In this example, the time required for HO, which will be several 10 milliseconds, is so much shorter than the cell residence time that this time is ignored in the calculation.

In FIG. 13, it is assumed that the frequency of the data transmission/reception of the mobile station is not so high that the mobile station can stay in DRX (the mobile station need not be kept in Active). In FIG. 12 and FIG. 13, a model is assumed in which cells 1 to 5 are adjacent each other and the mobile station moves on a straight line at a constant velocity along the diameters of the multiple cells.

FIG. 13 shows that, when the movement velocity of the mobile station is 120 km/h (2 km/minute) and the radius of the cell is 6 km (cell diameter=12 km), the time the mobile station resides in each cell is 12 km/2 km=6 minutes (X+Y=6 minutes in FIG. 12), and HO is performed 4 times.

Therefore, in 30 minutes, the mobile station moves across 5 (=4+1) cells and resides in the DRX cycle for 5 (=6−1) minutes in each cell (that is, X=1 minute and Y=5 minutes in FIG. 12).

As a result, in 30 minutes, the mobile station stays in DRX for 5×5=25 minutes.

On the other hand, when the movement velocity is 60 km/h and the cell diameter is 1 km, the residence time in each cell and the transition time from Active to DRX are both 1 minute and, therefore, the mobile station does not transit to DRX for 30 minutes.

That is, in FIG. 12, Y=0 minute because X=1 minute and X+Y=1 minute, meaning that the next HO operation is started without starting the DRX control in a target cell and, as a result, while the mobile station moves from cell 1 through to cell 5, HO is performed four times without performing the DRX control.

As described above, when the residence time of a low-Activity mobile station in one cell is shorter than the transition time to DRX (this time is managed, for example, by a timer in the base station side), the mobile station cannot make a transition to DRX in the cell and, as a result, consumes extra power.

Similarly, when the residence time in a cell is shorter than the transition time to the RRC_Idle state, the mobile station cannot make a transition to the RRC_Idle state and, as a result, consumes extra power. In this case, a mobile station, whose Activity is low enough to transit the mobile station to the RRC_Idle state, repeats unnecessary HO. Such wasteful HO will result in a higher network load (base station, UPE/MME) than it is supposed to be, and hence there is room for improvement.

An exemplary embodiment in another aspect of the present invention is that the DRX control of a mobile station, which is performed in a target cell after inter base station HO, is started at the same time the HO is completed. By doing so, the exemplary embodiment prevents the mobile station from consuming extra power in the target cell and avoids the repetition of unnecessary HO, thus reducing the network load. In the exemplary embodiment described below, too, an example in which the present invention is applied to a system, proposed by 3GPP LTE, is described though not limited thereto.

Figure 2:
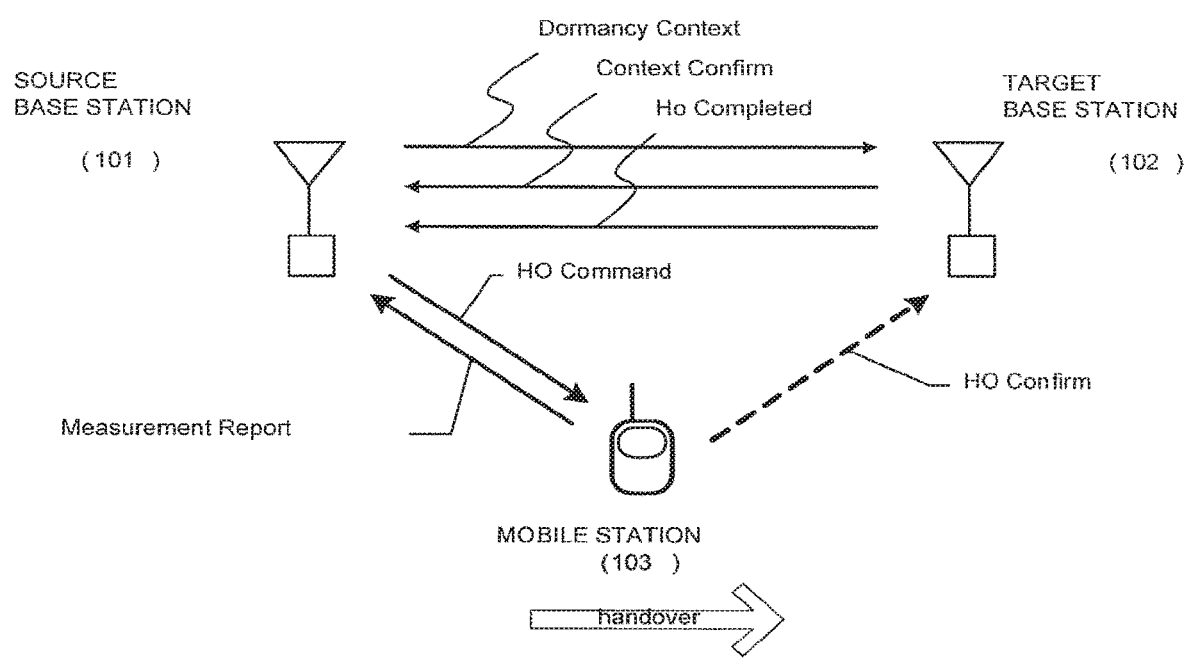
FIG. 2 is a diagram for explaining inter base station handover in one exemplary embodiment of the present invention.

FIG. 1 and FIG. 2 are diagrams showing the flow (sequence diagram) of inter base station HO of a mobile station, for which the DRX operation is performed in this exemplary embodiment, and the concept of the system configuration.

A source base station (101) transmits uplink scheduling information (UL allocation) to a mobile station (103) and, before performing inter base station HO, the mobile station (103) first transmits a Measurement Report on neighboring cells of the source cell, where the mobile station (103) is now located, to the source base station (101).

The source base station (101) transmits the signal (DRX Control Signaling) to the mobile station (103) to instruct the mobile station (103) to transit from the DRX to Active, and stops the DRX control of the mobile station (103).

The source base station (101) transfers Dormancy Context as well as QoS Profile and AS Configuration of the mobile station (101) to a target base station (102).

After receiving the notification signal (Context Confirm), which indicates that the target base station (102) is ready to accept HO, from the target base station (102), the source base station (101) transmits the signal of HO start permission (HO Command) to the mobile station (101).

After receiving the control signal (HO Command) from the source base station (101), the mobile station (103) accesses the target base station (102) via the RACH(Random Access Channel), which is a uplink channel, to acquire the transmission timing adjustment value (Timing Advance: TA) and uplink scheduling information (UL Allocation) from the target base station (102).

The mobile station (103) adjusts the transmission timing according to the transmission timing adjustment value (TA) and transmits the signal (HO Confirm) to the target base station (102) at the allocated time and frequency to notify the target base station (102) that the mobile station (103) has performed hand over.

The target base station (102) transmits the control signal (HO Completed) to the source base station (101) and notifies an MME/UPE (104) that the mobile station (103), which performed the inter base station HO, has moved to the cell managed by the target base station (102) (UE update to MME/UPE) and, after that, completes the inter base station HO operation.

After the HO operation is completed, the target base station (102) uses at least Dormancy Context, which is one of the following that include information on the mobile station in the source cell and that has been transferred from the source base station (101), QoS profile;
AS Configuration;
Dormancy Context;
Amount of packets arrived from UPE (User Plane Entity); and Internal information that the target base station (102) has; to perform the DRX control of the mobile station (101) and transmits the signal (Early DRX Control Signaling) that makes the mobile station transit to an appropriate DRX state.

Any of the following may be used as an item for Dormancy Context.

(A) Current DRX level;
(B) Residence time in the current DRX level
(C) Average DRX level in the source cell
(D) Maximum DRX level in the source cell
(E) Minimum DRX level in the source cell
(F) Transmission buffer size in the HO preparation period
(G) Scheduling time in the source cell/RRC_Connected residence time in the source cell Although the DRX cycle (DRX period) is defined according to a DRX level in this exemplary embodiment, the length of the DRX cycle may be determined according to a DRX level each time the base station performs the DRX control operation. Alternatively, a table containing the correspondence between DRX levels and DRX cycles (DRX periods) may be provided in a base station or a mobile station to determine the DRX cycle (DRX period) by referencing the correspondence table. It is desirable that, for a higher DRX level, the length of the non-reception period in the DRX cycle be lower than the length of the reception period in the DRX cycle. This correspondence is assumed in the description of the exemplary embodiment below but the exemplary embodiment is not limited to this setting.

The present invention provides the following methods for performing the DRX control.

(I) Fix the DRX cycle (DRX period) and adjust the ratio between the reception period and the non-reception period.

(II) Fix the reception period, and adjust the non-reception period. At the same time, vary the length of the DRX cycle (DRX period).

(III) Fix the ratio between the reception period and the non-reception period, and adjust the DRX cycle (DRX period).

For each item for Dormancy Context, the following describes how to determine $L_{NEW}$ that is the DRX level of a mobile station in the target cell after the inter base station HO is performed.

Figure 3:
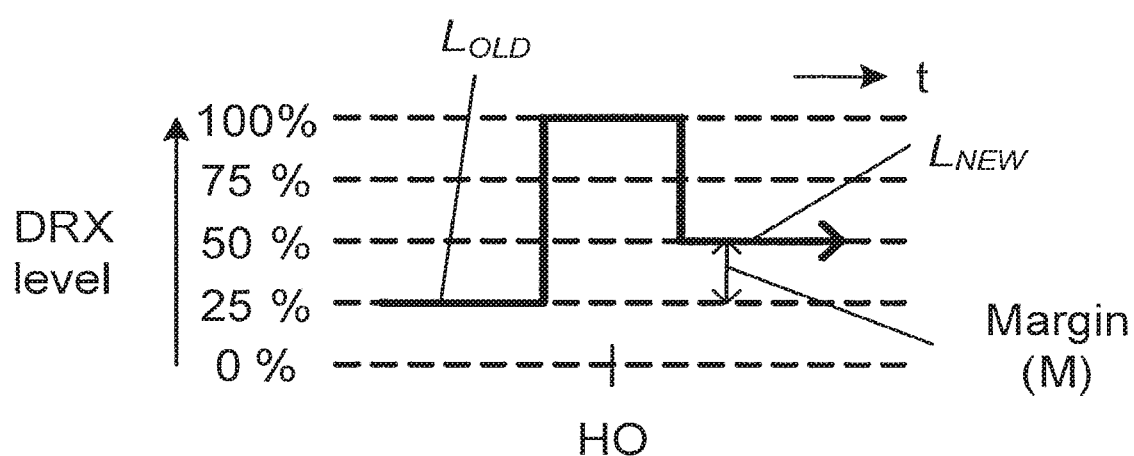
FIG. 3 is a diagram for explaining activity level control of a mobile station after inter base station handover in one exemplary embodiment of the present invention.

(A) When the current (in the source cell at HO requested) DRX level ($=L_{OLD}$) is used as Dormancy Context, $L_{NEW}$ is determined from expression (1) (see FIG. 3).

$$L_{NEW}=L_{OLD}+M \quad (1)$$

where M is the predefined margin that is a fixed value. In the example shown in FIG. 3, M=25% and, because $L_{OLD}$ is 25%, $L_{NEW}$=50%.

Figure 4A:
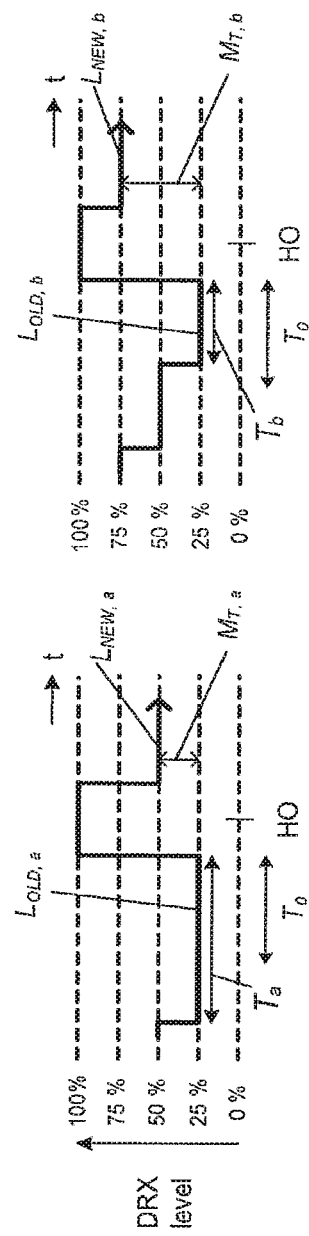
FIGS. 4A and 4B are diagrams for explaining activity level control of a mobile station after inter base station handover in one exemplary embodiment of the present invention.
Figure 4B:
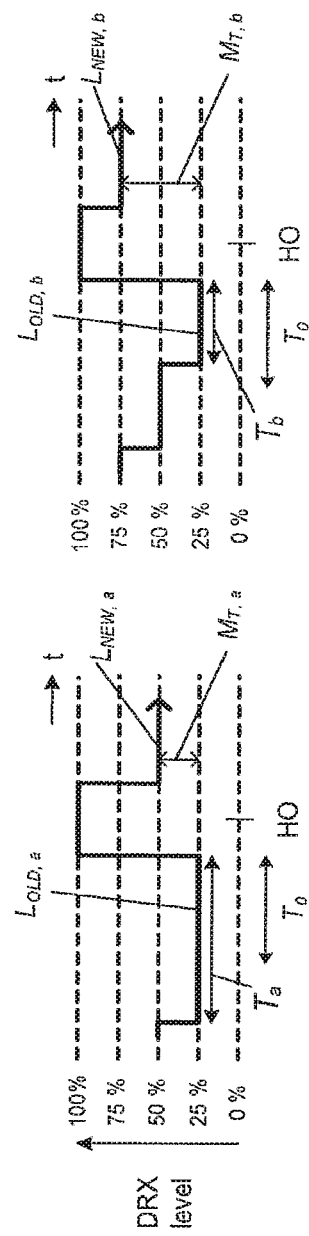

(B) When the current DRX residence time T and the current DRX level are used as the Dormancy Context, $L_{NEW}$ is determined from expressions (2) and (3) (see FIGS. 4A and 4B).

$$L_{NEW}=L_{OLD}+M_T \quad (2)$$

$$M_T = \begin{cases} M1 & (T \geq T_0) \\ M2 & (T < T_0) \end{cases} \quad (3)$$

where M1 and M2 are predefined margins and M1<M2. $T_0$ is a threshold for selecting one of the predefined margins. If the current DRX residence time T is greater than or equal to the threshold time $T_0$, the margin $M_T$ is set to M1; if T is less than $T_0$, $M_T$ is set to M2. $L_{NEW}$ is the value generated by adding $M_T$ to $L_{OLD}$.

(C) When the average DRX level ($=L_{AVE}$) in the source cell is used as Dormancy Context, $L_{NEW}$ is determined from expression (4).

$$L_{NEW}=L_{AVE}+M_{AVE} \quad (4)$$

In this case, if an integer value is used as the DRX level, $L_{AVE}$ is an integer greater than or equal to (or less than or equal to)

$$(\Sigma_{i=1}^{I} t_i L_i)/\Sigma_{i=1}^{I} t_i \quad (5)$$

and is closest to that value, and $M_{AVE}$ is the predefined fixed margin.

(D) When the maximum DRX level ($=L_{MAX}$) in the source cell is used as Dormancy Context, $L_{NEW}$ is determined from expression (6).

$$L_{NEW}=L_{MAX}+M_{MAX} \quad (6)$$

where $M_{MAX}$ is a predefined margin that is fixed.

(E) When the minimum DRX level ($=L_{MIN}$) in the source cell is used as Dormancy Context, $L_{NEW}$ is determined from expression (7).

$$L_{NEW}=L_{MIN}+M_{MIN} \quad (7)$$

where $M_{MIN}$ is a predefined margin that is fixed.

Figures 5A, 5B:
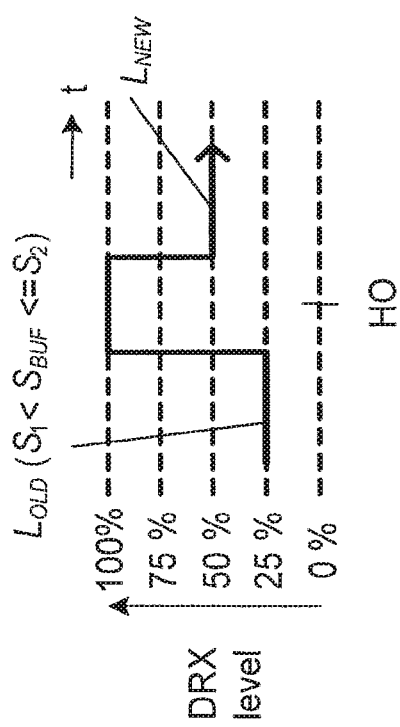
FIGS. 5A and 5B are diagrams for explaining activity level control of a mobile station after inter base station handover in one exemplary embodiment of the present invention.

(F) When the transmission buffer size ($S_{BUF}$) of the source base station in the HO preparation period in the source cell is used as Dormancy Context, $L_{NEW}$ is determined based on the relation between K thresholds and K−1 DRX levels defined in advance as shown in expression (8) (see FIGS. 5A and 5B).

$$L_{NEW} = \begin{cases} L_K, & (S_K < S_{BUF} \leq \infty) \\ \vdots & \\ L_2, & (0 < S_{BUF} \leq S_1) \\ L_1, & (S_{BUF} = 0) \end{cases} \quad (8)$$

In the example in FIG. 5A, because the transmission buffer size $S_{BUF}$ of the source base station in the HO preparation period in the source cell is $S_1 \leq S_{BUF} \leq S_2$, when $L_{OLD}$ is 25%, we have $$L_{NEW}=50\%$$

from the table of correspondence between buffer thresholds and $L_{NEW}$ shown in FIG. 5B. The table of correspondence between buffer thresholds and $L_{NEW}$ is held in a memory (for example, rewritable nonvolatile memory) that can be referenced by the controller in the base station.

(G) When the scheduling residence time in the source cell/RRC_Connected residence time in the source cell ($R_{SCR}$) is used as Dormancy Context, $L_{NEW}$ is determined based on the relation between K thresholds and K−1 DRX levels defined in advance as shown in expression (9).

$$L_{NEW} = \begin{cases} L_K, & (R_K < R_{SCR} \leq \infty) \\ \vdots & \\ L_2, & (R_1 < R_{SCR} \leq R_2) \\ L_1, & (0 < R_{SCR} \leq R_1) \end{cases} \quad (9)$$

(H) When two or more (J) items described above are used as Dormancy Context, $L_{NEW}$ is determined from expression (10).

$$L_{NEW} = \Sigma_{j=1}^{J} w_j \cdot L_{NEW,j} + M \quad (10)$$

where $w_j$ is the weight on $L_{NEW,j}$, determined from the jth Dormancy Context, and satisfies the following relation.

$$\Sigma_{j=1}^{J} w_j = 1 \quad (11)$$

The following describes some examples.

First Exemplary Embodiment

Figure 6:
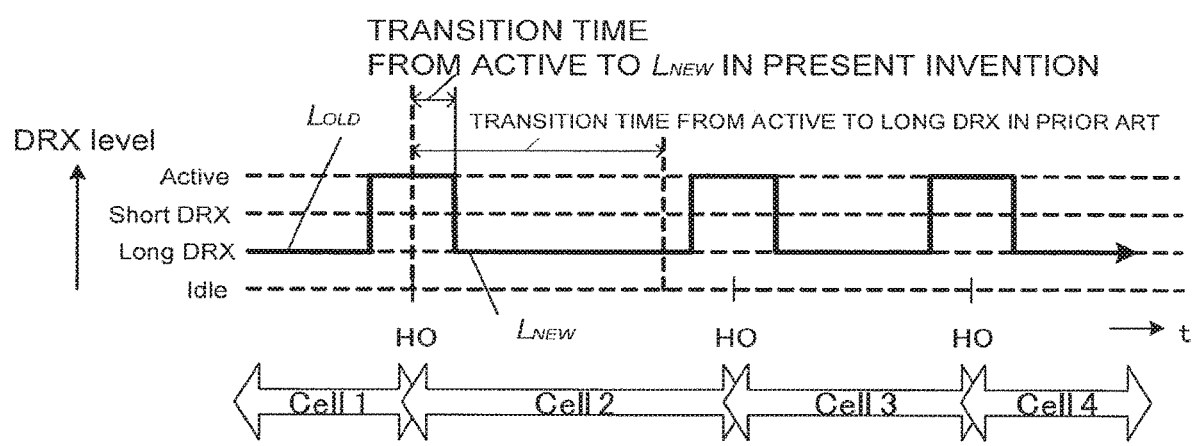
FIG. 6 is a diagram for explaining activity level control of a mobile station in a first exemplary embodiment of the present invention.

FIG. 6 and FIG. 7 are diagrams showing a first exemplary embodiment of the present invention. In the first exemplary embodiment, the current DRX cycle is used as Dormancy Context, and the DRX level of the mobile station in the HO completion period in the target cell is determined using expression (12) shown below (same as expression (1) shown above).

$$L_{NEW} = L_{OLD} + M \quad (12)$$

In this example, M=0, that is, the DRX level in the target cell in the HO completion period is set to the same state as that of the DRX level in the source cell immediately before the HO operation was started.

In this example, the DRX level of the mobile station is called as follows.

"Active" when the DRX level is 100%
"Short DRX" when the DRX level is 60%
"Long DRX" when the DRX level is 20%
"Idle" when the DRX level is 0%

As described above, a DRX level lower than 100%, for example 90%, may be defined as "Active". For example, the ratio of the non-reception period of the "Short DRX" in the DRX cycle is configured shorter than the non-reception period of "Long DRX".

Assume that there are four cells, 1, 2, 3, and 4, and that the cells and base stations are related in such a way that cells 1, 2, 3, and 4 are managed respectively by base stations 1, 2, 3, and 4.

Also assume that the mobile station performs HO in cells 1, 2, 3, and 4 in this order and that, in cells 2, 3, and 4, the mobile station performs data transmission/reception only for the HO operation.

Assume that the change in the DRX level in the present invention is as shown in FIG. 6 when the mobile station, which is under control of the DRX operation, performs inter base station HO.

In the initial state, assume that the mobile station that is moving fast resides in cell 1 and that the DRX level is Long DRX. When performing inter base station HO to cell 2, this mobile station becomes Active and performs the HO operation.

Because the DRX level of the mobile station in the target cell in the HO completion period, is configured equal to the DRX level in the source cell in this example, the DRX level of the mobile station in cell 2 in the HO completion period is determined Long DRX that is the same DRX level as that in cell 1.

In the HO completion period, base station 2 transmits a signal (Early DRX Control Signaling), which instructs the mobile station to transit to Long DRX, to the mobile station and starts the DRX control of the mobile station immediately after the completion of HO.

The mobile station performs HO from cell 2 to cell 3 and from cell 3 to cell 4. In this case, as in the HO from cell 1 to cell 2, each base station immediately instructs the mobile station to transit to Long DRX in the HO completion period and starts the DRX control. This reduces the extra power consumption of the mobile station in the cell after the HO.

FIG. 7 shows the DRX residence time of a mobile station during 30 minutes on the assumption that the transition time from Active to DRX is one minute and the mobile station intermittently transmits and receives data during the 30 minutes. Because the time required for HO, several 10 milliseconds, is so much shorter than the cell residence time that this time is ignored in the calculation.

It is assumed that the frequency of the data transmission/reception of the mobile station is not so high in the HO destination that the mobile station can stay in the DRX (the mobile station need not stay in the Active). It is also assumed that, in each cell, the mobile station moves through the center of the cell and moves the distance equal to the diameter of the cell. A model is assumed in which the cells are adjacent each other and the mobile station moves on the straight line at a uniform speed along the diameters of the multiple cells.

In case the present invention is used, the DRX level of the mobile station is changed to a DRX level equal to that in the source level, immediately after the completion of the HO (for example, in several milliseconds).

For example, when the movement speed of the mobile station is 120 km/h and the diameter of the cell is 12 km in FIG. 7, the time the mobile station resides in each cell is 6 minutes, HO is performed 4 times, and the mobile station resides across 5 cells.

In the example shown in FIG. 13, the transition from Active to DRX is triggered by the time out in the timer which the base station has, as described above, and hence the DRX residence time in 30 minutes is 25 (=(6−1)×5) minutes.

In contrast, because the mobile station can transit to the DRX in the HO completion period in this example, the DRX residence time during 30 minutes is 29 minutes, which is the sum of 5 (=6−1) minutes during which the mobile station resides in the first cell and 24 (=4×6) minutes during which the mobile station resides in the cells after the HO.

As a result, the DRX residence period of the present invention is four minutes longer than that (25 minutes) in the exemplary embodiment shown in FIG. 13. And, the power consumption of the mobile station can be decreased in proportion to an increase in the DRX residence period.

On the other hand, when the movement speed is 60 km/h and the cell diameter is 1 Km, the mobile station resides in each cell for one minute, HO is performed 29 times, and the mobile station resides across 30 cells.

Because both the residence time in each cell and the transition time from Active to DRX are one minute in the example shown in FIG. 13, the mobile station does not transit to DRX, during 30 minutes. That is, the mobile station remains Active during 30 minutes.

In contrast, the mobile station can transit to DRX (for example, Long DRX), immediately after the completion of HO in this example and, in each cell, the mobile station can stay in DRX after HO. For this reason, during 30 minutes, the mobile station can reside in DRX for the maximum of 29 minutes that is the sum of 0 (=1−1) minute during which the mobile station resides in the first cell and 29 (=1×29) minutes during which the mobile station reside in the cells after HO.

As a result, the DRX residence period according to the present invention is 29 minutes longer than that in the case shown in FIG. 13, thus further decreasing the power consumption of the mobile station.

Second Exemplary Embodiment

FIG. 8 and FIG. 9 are diagrams showing a second exemplary embodiment of the present invention. As the second exemplary embodiment of the present invention, the following describes a case in which the current DRX level $L_{OLD}$ and the current DRX level residence time T are used as Dormancy Context to determine the DRX level of the mobile station in the HO completion period in the target cell using expressions (13) and (14) (same as expressions (2) and (3)).

$$L_{NEW} = L_{OLD} + M_T \quad (13)$$

$$M_T = \begin{cases} M1 & (T \geq T_0) \\ M2 & (T < T_0) \end{cases} \quad (14)$$

where $T_0$ is a predefined threshold, and $M_T$ is a margin. Assume that M1=−40% and M2=0% and that the value of the DRX level, if negative, is replaced by 0.

In this example, the DRX level of the mobile station is called as follows:
"Active" when the DRX level is 100%;
"Short DRX" when the DRX level is 60%;
"Long DRX" when the DRX level is 20%; and
"Idle" when the DRX level is 0%.

As described above, a DRX level lower than 100%, for example 90%, may be defined as "Active". For example, the ratio of the non-reception period of the "Short DRX" in the DRX cycle is configured shorter than the non-reception period of "Long DRX".

Assume that the cells and base stations are related in such a way that cells 1, 2, 3, and 4 are managed respectively by base stations 1, 2, 3, and 4 and that, in cells 2, 3, and 4, the mobile station performs data transmission/reception only for the HO.

Assume that the change in the DRX level in this example is as shown in FIG. 8 when the mobile station performs inter base station HO.

In the initial state, assume that the mobile station that is moving fast resides in cell 1 and its DRX level is Long DRX. Also assume that the time $T_1$, during which this mobile station stays in Long DRX in cell 1, is greater than or equal to $T_0$.

When performing an inter base station HO to cell 2, this mobile station transit to Active and performs the HO.

In this example, the DRX level of the mobile station in the target cell in the HO completion period is the value generated by adding the margin to the DRX level in the source cell. Therefore, the DRX level $L_{NEW,2}$ of the mobile station in cell 2 in the HO completion period is calculated by adding the margin $M_T$=M1=−40% to the DRX level $L_{OLD,1}$=20% in cell 1. This calculation gives 0% (the actual value is −20%, and the negative value is replaced by 0) and determines that the mobile station will transit to the Idle state.

In the HO completion period, base station 2 transmits a signal (Early DRX Control Signaling) to the mobile station to instruct it to transit to the Idle state.

The transition of the mobile station to the Idle state eliminates the need for the mobile station to sequentially perform HO from cell 2 to cell 3 and from cell 3 to cell 4, thereby reducing the extra power consumption of the mobile station.

Another advantage is that the network (NW) can avoid an increase in the load that will be caused by repeated unnecessary HO of the mobile station.

FIG. 9 shows the number of times the mobile station repeats HO until the mobile station transits to Idle on the assumption that the transition time from Active to Long DRX is one minute and the transition time from Long DRX to Idle is five minutes.

The time required for HO, several 10 m seconds, is so much shorter than the cell residence time that it is neglected in the calculation.

It is assumed that, in the initial state, the DRX level is Long DRX in a cell where the mobile station resides first, the mobile station definitely performs HO to the next cell, and the observation time is 30 minutes.

It is also assumed that the mobile station moves through the center of each cell and moves the distance equal to the diameter. When the present invention is applied, the DRX level is determined to be the value, generated by adding the margin to the DRX level equal to that in the source cell, immediately after the completion of HO (for example, several milliseconds).

In this example, if the maximum DRX residence time is less than five minutes, the mobile station stays in Long DRX and, if the maximum DRX residence time is greater or equal to five minutes, a negative margin is added to make the mobile station transit to Idle state (RRC_Idle).

In FIG. 9, when the movement velocity of the mobile station is 120 km/h and the cell diameter is 12 Km, the time the mobile station resides in each cell is six minutes. The mobile station performs HO once only in the first time and so the mobile station resides across two cells.

In the related art, the transition from Active to Long DRX or from Long DRX to Idle is triggered when the timer of the base station has timed out. Therefore, the mobile station transits to Long DRX in one minute in the second cell and, after that, transits to Idle in five minutes.

In the present invention, because the mobile station transits to Long DRX in the HO completion period and, after that, transits to Idle in five minutes, HO is performed once as in the related art.

It takes one minute for the mobile station to transit to Long DRX in the example shown in FIG. 13, whereas the mobile station in this example transits to Long DRX without waiting one minute but in as short as several milliseconds. This reduces the power consumption of the mobile station.

Next, when the movement velocity is 60 Km/h and the cell diameter is 1 km, the residence time in each cell is one minute.

Because the next HO is performed before the mobile station transits to Long DRX in the example shown in FIG. 13, the mobile station repeats HO during 30 minutes of the observation time, with the result that HO is repeated 29 times.

In contrast, because the mobile station is allowed to transit to Long DRX immediately after the first HO (for example, in several milliseconds) in this example, the Long DRX residence time is added up, even if HO is repeated. After HO is repeated five times, the mobile station transits from Long DRX to Idle.

As a result, the present invention reduces the number of HO operations by 24 as compared with the example shown in FIG. 13, reduces the power consumption of the mobile station, and reduces the load of the network (NW).

As described above, the present invention avoids extra power consumption in the inter base station HO of a mobile station that performs the DRX operation and an increase in the load of the NW.

In addition to those described above, the maximum transmission buffer size of the source base station, the average buffer size of the source cell base station, and so on may be used as Dormancy Context. The average buffer size of the source cell base station and so on are calculated either from the monitoring result of the transmission buffer size obtained via a periodical polling or from a log result of the transmission buffer size based on the generation of an event at the time data is accumulated in the transmission buffer.

Figure 10:
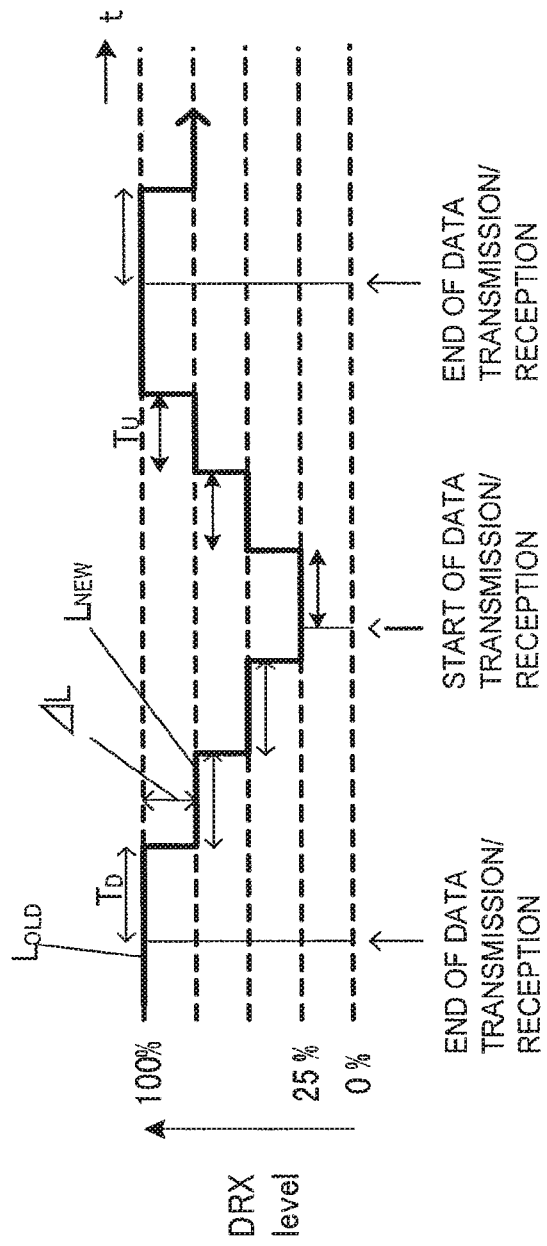
FIG. 10 is a diagram for explaining activity level control of a mobile station in one exemplary embodiment of the present invention.

The method described below may be used for performing the DRX control in the target cell after HO (see FIG. 10).

When a mobile station and a base station have established the RRC connection (RRC_Connected state) but the mobile station does not perform data transmission/reception for a predetermined time TD, the DRX level of the mobile station is decreased as shown by expression (15).

$$L_{NEW} = L_{OLD} - \Delta L \quad (15)$$

Conversely, when a mobile station continues data transmission/reception for a predetermined time TU, the DRX level of the mobile station is increased as shown by expression (16).

$$L_{NEW} = L_{OLD} - \Delta L \quad (16)$$

To implement this DRX control, one of the following two methods may be used.

The base station determines $L_{NEW}$ and notifies the mobile station of $L_{NEW}$.

The base station notifies the mobile station of DL, TU, and TD, and the base station and the mobile station each determine $L_{NEW}$.

This DRX control method is applicable not only to a mobile station that has performed HO but also to the mobile stations residing in one cell.

Although the transition time from Active to Long DRX is assumed to take one minute in the above example, the effect of the present invention becomes more remarkable as the transition time from Active to Long DRX becomes longer. In the present invention, if a mobile station starts continuous reception on the downlink but data is not transmitted for a predetermined period, there is a case in which the mobile station does not enter into DRX (discontinuous reception), but transits to the RRC_IDLE state.

Figure 14:
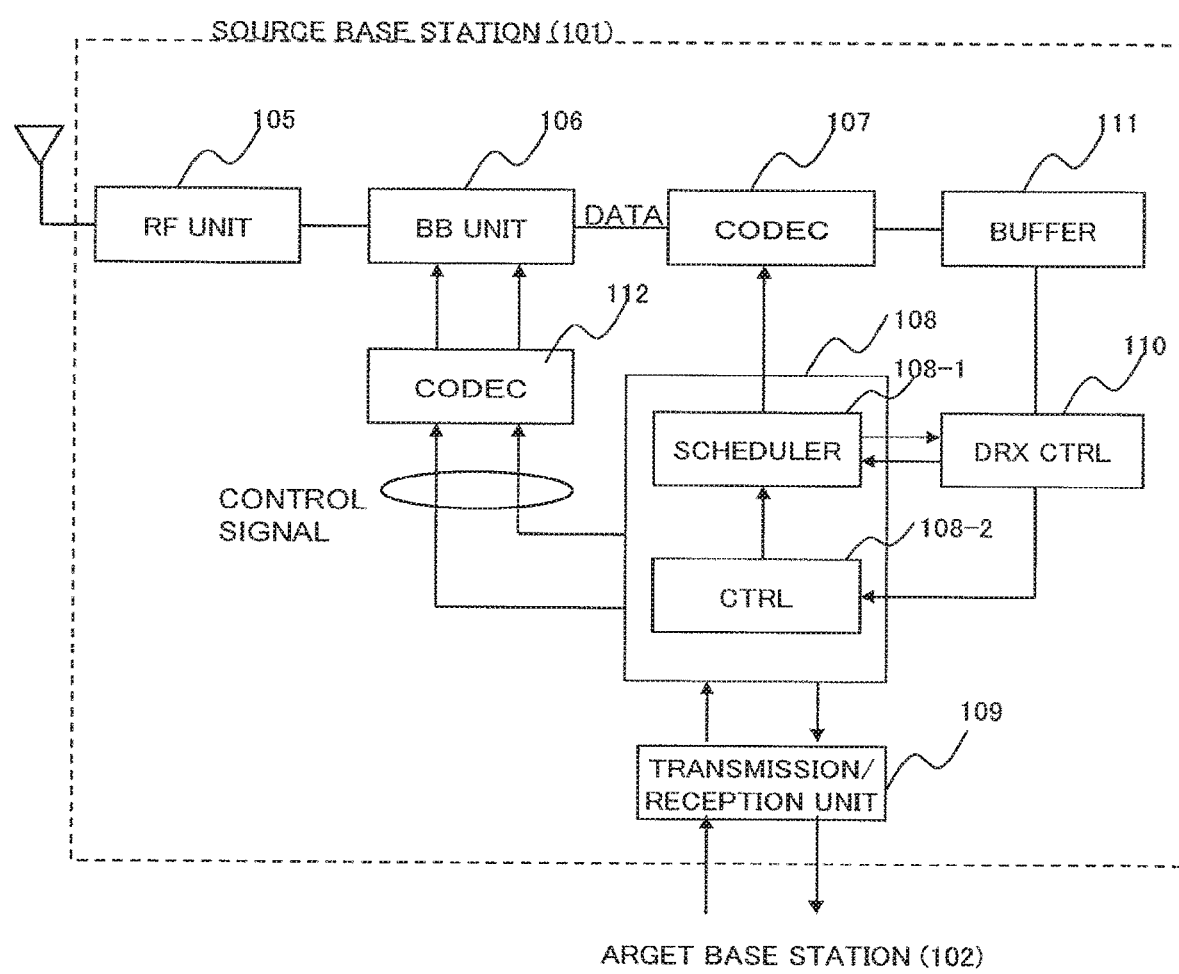
FIG. 14 is a diagram showing an example of the configuration of a base station in one example of the present invention.

FIG. 14 is a diagram schematically showing an example of the configuration of a base station in the example shown in FIG. 1 and FIG. 2. Because the source base station (101) and the target base station (102) in FIG. 1 and FIG. 2 have the same configuration, FIG. 14 shows the configuration of the source base station only. Referring to FIG. 14, the source base station comprises a radio unit (RF) 105 that has a transmission unit and a reception unit not shown, a baseband unit 106 that performs baseband processing, a coding/decoding unit (CODEC) 107 that codes transmission data and decodes reception data, a control unit 108, a transmission/reception unit 109 that communicates with a target base station via a wired line, a DRX controller 110 that derives a DRX level, a buffer unit 111, and a coding/decoding unit 112 that codes a control signal to be transmitted and decodes a received control signal.

The control unit 108 comprises a scheduler 108-1 that controls the operation of the coding/decoding unit (CODEC) 107 and the DRX controller 110 and a controller 108-2 that controls the transmission/reception unit 109. The buffer unit 111 comprises a transmission buffer (not shown) in which transmission data is accumulated and a reception buffer (not shown) in which reception data is accumulated. The DRX controller 110 monitors data accumulated in the transmission buffer of the buffer unit 110, derives the Activity level of a mobile station and, as described above, derives a DRX level having the correlation with the Activity level itself or with the Activity level obtained from the operation for the Activity level. The scheduler 108-1 notifies the DRX controller 110 when to monitor the transmission buffer.

When a DRX level is acquired from the DRX controller 110, the controller 108-2 performs the DRX to transmit the signal (DRX Control Signaling) to the mobile station. The control signal from the control unit 108 is coded by the coding/decoding unit 112 to generate a control signal corresponding to DRX Control Signaling and, after the baseband processing is performed, the control signal is radio-transmitted to the mobile station from the radio unit 105. The controller 108-2 transmits not only Dormancy Context including the DRX level received from the DRX controller 110 but also Context Data including QoS Profile and As Configuration to the target base station via the transmission/reception unit 109. In addition, when a signal (Context Confirm, HO Completed, etc.) is received from the target base station via the transmission/reception unit 109, the controller 108-2 notifies the scheduler 108-1 of the received signal and, when the corresponding event is generated, the scheduler 108-1 schedules the next processing.

Figure 15:
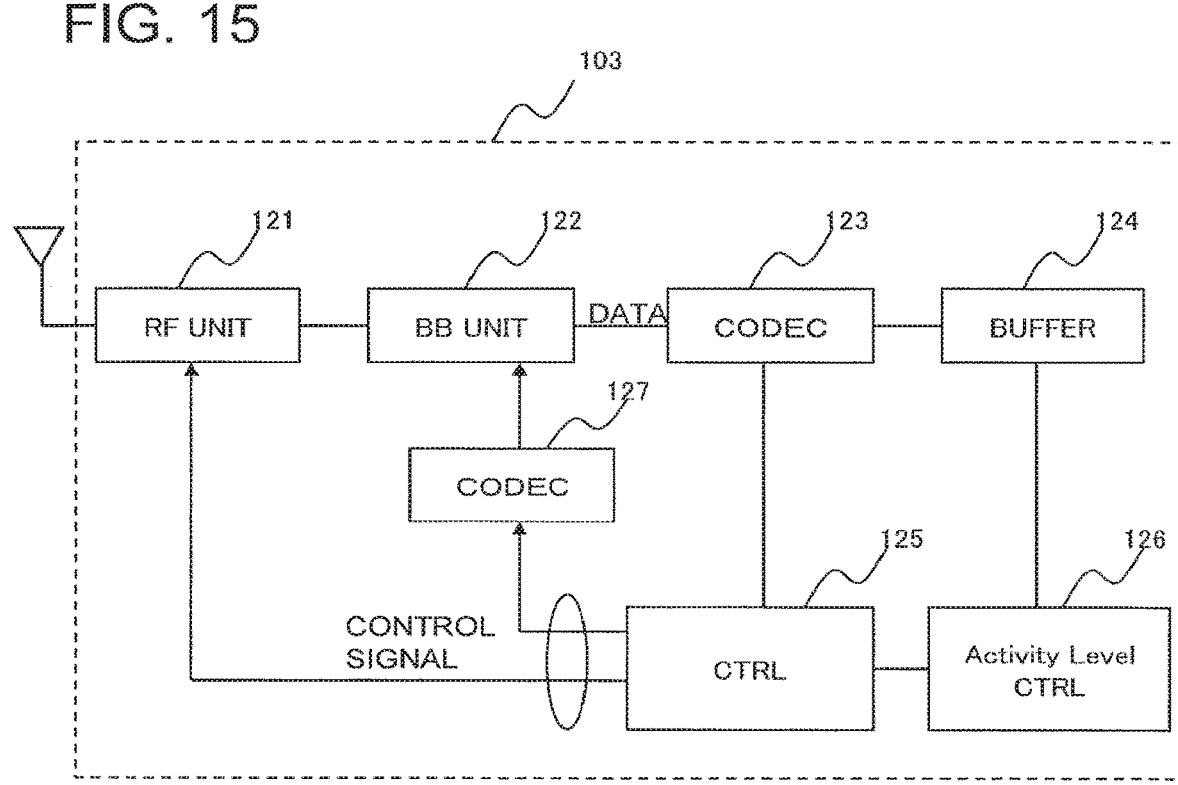
FIG. 15 is a diagram showing an example of the configuration of a mobile station in one example of the present invention.

In the present invention, a 3GPP-LTE portable terminal may be used as a mobile station. As described above, either the base station side may detect the Activity level of a mobile station and derive the DRX level or the mobile station side detects the Activity level of the mobile station and notifies the base station of the detected Activity level. FIG. 15 is a diagram showing an example of the configuration of a mobile station in one example of a communication terminal of the present invention. Referring to FIG. 15, an Activity level controller (Activity Level CTRL) 126 of the mobile station (communication terminal) 103 monitors the accumulation state of the transmission buffer of a buffer unit 124 and calculates the Activity level. A control unit 125, which comprises a schedule unit not shown, controls the monitoring of the accumulation state of the transmission buffer of the buffer unit 124. The Activity level may be transmitted to the base station, for example, as the control signal to allow the base station to derive the DRX level based on the Activity level, received from the mobile station, and to perform the DRX control. In the non-reception period of the DRX cycle, the mobile station 103 inactivates the RF reception unit (not shown) of an RF unit 121. The description of a baseband unit 122, CODEC units 123 and 127, etc., is omitted.

Figure 16:
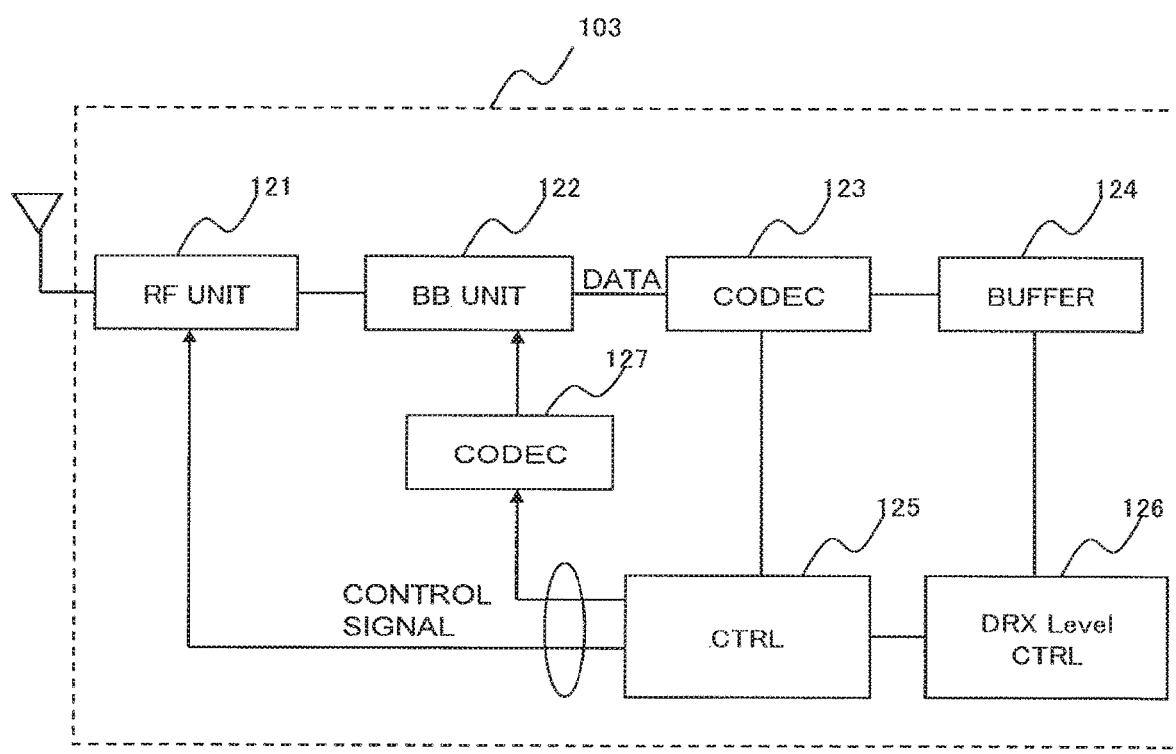
FIG. 16 is a diagram showing an example of the configuration of a mobile station in another example of the present invention.

FIG. 16 is a diagram showing an example of the configuration of a mobile station in another example of a communication terminal of the present invention. The mobile station (communication terminal) in this example comprises a DRX level controller (DRX Level CTRL) 128 instead of the Activity level controller shown in FIG. 15. The DRX level controller 128 monitors the accumulation state of the transmission buffer (not shown) of the buffer unit 124 to calculate the Activity level and derives the DRX level according to the Activity level. The mobile station autonomously performs the DRX control according to the acquired DRX level. When transitioning to the DRX control, the mobile station transmits a control signal to the base station to notify it about the DRX level and the start of the DRX control, and the base station records and manages the start of the DRX control.

Figure 17A:
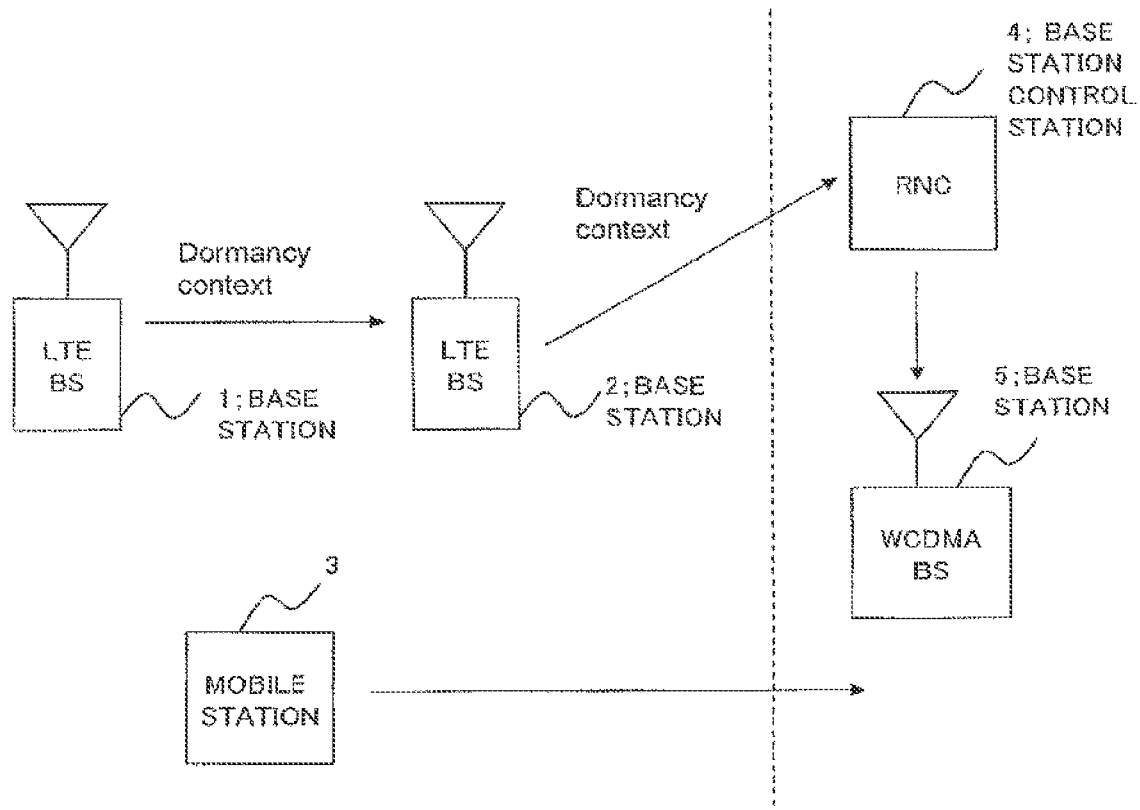
FIGS. 17A and 17B are diagrams for explaining HO in another example of the present invention.
Figure 17B:
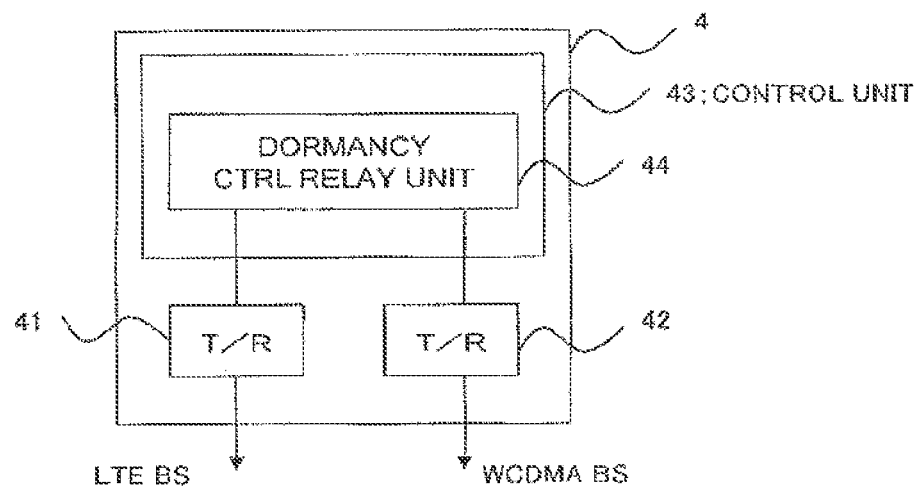

Next, as another example of the present invention, the following describes an example of a mobile station compatible with the dual operation of 3GPP LTE and WCDMA (Wideband Code Division Multiple Access). FIGS. 17A and 17B are diagrams schematically showing another example of the present invention. FIG. 17B is a diagram showing the configuration of the dormancy control unit of a base station control station (RNC: also called "Radio Network Controller") 4 shown in FIG. 17A. At least Dormancy Context is transferred from a first LTE base station 1 to a second LTE base station 2 to allow the second LTE base station 2 to immediately perform the DRX control according to the DRX level that has been used by the first LTE base station 1. When handover from the second LTE base station 2 to a WCDMA base station 5 is performed, at least Dormancy Context is transferred from the second LTE base station 2 to the base station control station (RNC) 4 and the DRX level is transmitted from the base station control station 4 to the base station 5 to allow the WCDMA base station 5 to perform the DRX control of a mobile station 3 according to the mobile station activity state of that 3GPP-LTE mobile station before the handover. As shown in FIG. 17B, the base station control station 4 comprises a Dormancy Control relay unit 44 that receives Dormancy Context from the LTE base station via a transmission/reception interface 41 and transmits it to the WCDMA base station 5, which is under the base station control station 4, via a transmission/reception interface 42.

It is, as a matter of course, possible to apply the present invention to handover between WLAN (Wireless Local Area Network) access points (AP) and to handover between WiMAX (Wireless interoperability of Microwave Access) base stations.

The present invention is applicable also to the control of the discontinuous reception of a first node when a transition occurs from a state, in which the first node and a second node that can perform radio-communication with each other are relatively movable and the second node manages the first node, to a state in which the first node and a third node that can perform radio-communication with each other (the third node can communicate with the second node) are relatively movable and the third node manages the first node.

FIG. 19 is a diagram showing a flow of inter base station handover in a modification of one exemplary embodiment of the present invention. In the exemplary embodiment shown in FIG. 1, the target base station 102 transmits the handover completion signal (HO Completed) to the source base station 101 and, after that, transmits the DRX control start instruction signal (Early DRX Control Signaling) to the mobile station 103. Instead of transmitting this signal (Early DRX Control Signaling), it is also possible to transmit the DRX control information to the mobile station 103, as shown in FIG. 19, by including DRX control information (for example, contents equivalent to the contents of Early DRX Control Signaling such as DRX level or DRX cycle) into a signal (Context Confirm), transmitted from the target base station 102 to the source base station 101, and into a command (HO Command) transmitted from the source base station 101 to the mobile station 103. That is, when Context Data is received from the source base station 101 in FIG. 19, the target base station 102 executes the DRX selection processing (DRX Selection) based on Dormancy Context included in Context Data and transmits the selected DRX control information (New DRX control information) to the source base station 101 via the signal (Context Confirm). The source base station 101 transmits the DRX control information (New DRX control information) to the mobile station 103 via a command (HO Command). The mobile station 103, which has received the signal (Context Confirm) transmits a signal (HO Confirm) to the target base station 102 and, immediately after the response indicating that a signal (HO Confirm) is correctly received is returned from the target base station 102, starts DRX.

To enable the proper consumption of the mobile station battery, DRX in E-UTRAN (Evolved UTRAN) has the following features.

There is no sub-state of RRC and MAC (Medium Access Control) for distinguishing between different DRX levels.

DRX values that can be utilized are controlled by the network (NW) and are present for x seconds from the non-DRX state. The value x may be the same as paging DRX used in LTE_IDLE (Actual values will be studied in future and are not defined in this specification).

The measurement request and the reporting criterion may vary according to the length of the DRX period. That is, a longer DRX period may correspond to a more relinquished request.

When the radio quality of the serving (serving cell) (accurate definition of radio quality will be studied in future) is higher than a threshold, the network (NW) may transmit the threshold to the mobile station (UE) to indicate that there is no need for the measurement of neighboring cells.

Regardless of the DRX cycle, a mobile station (UE) may use a first available opportunity of RACH in order to transmit a measurement report (UL measurement report). Immediately after transmitting the measurement result, the mobile station (UE) may change its own DRX operation (whether or not the method is predefined by the eNB will be studied in future).

HARQ processing regarding uplink data transmission is independent of the DRX processing. Whether or not the DL data HARQ processing is independent of the DRX processing will be studied in future.

During handover, a source eNB transfers Dormancy Context to a target eNB to optimize the continuation of DRX control before and after the handover. The Dormancy Context includes at least the latest DRX level and an average/maximum/minimum DRX level in the source cell. If the UE has been at a low DRX level in the source cell, the target eNB may use Dormancy Context also for the processing for shifting the state of the UE to LTE_IDLE.

While the present invention has been described with reference to the examples above, it is to be understood that the present invention is not limited to the configuration of the examples above and that modifications and changes that may be made by those skilled in the art within the scope of the present invention are included.

The exemplary embodiments and the examples may be changed and adjusted in the scope of all disclosures (including claims) of the present invention and based on the basic technological concept thereof. In the scope of the claims of the present invention, various disclosed elements may be combined and selected in a variety of ways.

What is claimed is:

1. A method for a user equipment (UE), the method comprising:
   receiving, from a source base station for transferring the UE from the source base station to a target base station, a plurality of configurations including:
      a first configuration of a first Discontinuous Reception (DRX) cycle which specifies periodic repetition of a first reception-monitoring time followed by a first non-reception-monitoring time,
      a second configuration of a second DRX cycle which specifies periodic repetition of a second reception-monitoring time followed by a second non-reception-monitoring time, and
      a first timer counting a period in the first DRX cycle to shift from the first DRX cycle to the second DRX cycle;
   performing, in a state of Radio Resource Control (RRC) connected with the target base station, DRX operation using the first DRX cycle; and
   performing, in a state of RRC connected with the target base station, the DRX operation using the second DRX cycle when the UE does not receive data from the target base station until the first timer expires while performing the DRX operation using the first DRX cycle,
   wherein a first length of the first reception-monitoring time and a second length of the second reception-monitoring time are same length, and a third length of the first non-reception-monitoring time is shorter than a fourth length of the second non-reception-monitoring time.

2. The method according to claim 1, further comprising:
   performing, in a state of RRC connected with the target base station, the DRX operation using the second DRX cycle when the UE receive a DRX control signal from the target base station.

3. The method according to claim 1, further comprising:
   shifting the DRX operation from using the second DRX cycle to using the first DRX cycle, if the UE received data while performing the DRX operation using the first DRX cycle.

4. The method according to claim 1, wherein
   the DRX operation in RRC Connected state is different from Paging DRX operation in RRC Idle state.

5. A method for a source base station, the method comprising:
   receiving, from a target base station, a plurality of configurations including:
      a first configuration of a first Discontinuous Reception (DRX) cycle which specifies periodic repetition of a first reception-monitoring time followed by a first non-reception-monitoring time,
      a second configuration of a second DRX cycle which specifies periodic repetition of a second reception-monitoring time followed by a second non-reception-monitoring time, and
      a first timer counting a period in the first DRX cycle to shift from the first DRX cycle to the second DRX cycle; and
   transmitting, to a user equipment (UE) for transferring the UE from the source base station to the target base station, the plurality of configurations,
   wherein the first configuration is used for performing, in a state of Radio Resource Control (RRC) connected with the target base station, DRX operation using the first DRX cycle,
   wherein the second configuration is used for performing, in a state of RRC connected with the target base station, DRX operation using the second DRX cycle when the UE does not receive data from the second base station until the first timer expires while performing the DRX operation using the first cycle, and
   wherein a first length of the first reception-monitoring time and a second length of the second reception-monitoring time are same length, and a third length of the first non-reception-monitoring time is shorter than a fourth length of the second non-reception-monitoring time.

6. The method according to claim 5, wherein
   the second configuration is used for performing, in a state of RRC connected with the target base station, DRX operation using the second DRX cycle when the UE receive a DRX control signal from the target base station.

7. The method according to claim 5, wherein
   the DRX operation in RRC Connected state is different from Paging DRX operation in RRC Idle state.

8. The method according to claim 5, the method further comprising:
   sending, to the target base station, time that the UE stays in a Radio Resource Control (RRC) Connected state at the source base station and a DRX configuration in the source base station.

9. A method for a target base station, the method comprising:
   transmitting, to a user equipment (UE) via a source base station for transferring the UE from the source base station to the target base station, a plurality of configurations including:
      a first configuration of a first Discontinuous Reception (DRX) cycle which specifies periodic repetition of a first reception-monitoring time followed by a first non-reception-monitoring time,
      a second configuration of a second DRX cycle which specifies periodic repetition of a second reception-monitoring time followed by a second non-reception-monitoring time, and
      a first timer counting a period in the first DRX cycle to shift from the first DRX cycle to the second DRX cycle;
   performing DRX operation with the first DRX cycle with the UE in a state of Radio Resource Control (RRC) connected; and
   performing the DRX operation using the second DRX cycle with the UE in a state of RRC connected when the UE does not receive data from the target base station until the first timer expires while performing the DRX operation using the first DRX cycle,
   wherein a first length of the first reception-monitoring time and a second length of the second reception-monitoring time are same length, and a third length of the first non-reception-monitoring time is shorter than a fourth length of the second non-reception-monitoring time.

10. The method according to claim 9, wherein
    the DRX operation in RRC Connected state is different from Paging DRX operation in RRC Idle state.

11. The method according to claim 9, further comprising:
    shifting the DRX operation from using the second DRX cycle to using the first DRX cycle, if the UE received data while performing the DRX operation using the first DRX cycle.

12. The method according to claim 9, further comprising:
transmitting, to the UE, a DRX control signal; and
starting, based on the DRX control signal, the DRX operation using the second DRX cycle.

13. The method according to claim 9, the method further comprising:
receiving, from the source base station, time that the UE stays in an RRC Connected state at the source base station and a DRX configuration in the source base station.

14. A user equipment (UE) comprising:
at least one hardware transceiver configured to receive, from a source base station for transferring the UE from the source base station to a target base station, a plurality of configurations including:
a first configuration of a first Discontinuous Reception (DRX) cycle which specifies periodic repetition of a first reception-monitoring time followed by a first non-reception-monitoring time,
a second configuration of a second DRX cycle which specifies periodic repetition of a second reception-monitoring time followed by a second non-reception-monitoring time, and
a first timer counting a period in the first DRX cycle to shift from the first DRX cycle to the second DRX cycle,
wherein the at least one hardware transceiver is configured to perform, in a state of Radio Resource Control (RRC) connected with the target base station, DRX operation using the first DRX cycle,
wherein the at least one hardware transceiver is configured to perform, in a state of RRC connected with the target base station, the DRX operation using the second DRX cycle when the UE does not receive data from the target base station until the first timer expires in the first DRX cycle, and
wherein a first length of the first reception-monitoring time and a second length of the second reception-monitoring time are same length, and a third length of the first non-reception-monitoring time is shorter than a fourth length of the second non-reception-monitoring time.

15. The UE according to claim 14, wherein
the at least one hardware transceiver further configured to perform, in a state of RRC connected with the target base station, the DRX operation using the second DRX cycle when the UE receive a DRX control signal from the target base station.

16. The UE according to claim 14, wherein
the UE shifts the DRX operation from using the second DRX cycle to using the first DRX cycle, if the UE received data while performing the DRX operation using the first DRX cycle.

17. The UE according to claim 14, wherein
the DRX operation in RRC Connected state is different from Paging DRX operation in RRC Idle state.

18. A source base station comprising:
at least one hardware transceiver configured to receive, from a target base station, a plurality of configurations including:
a first configuration of a first Discontinuous Reception (DRX) cycle which specifies periodic repetition of a first reception-monitoring time followed by a first non-reception-monitoring time,
a second configuration of a second DRX cycle which specifies periodic repetition of a second reception-monitoring time followed by a second non-reception-monitoring time, and
a first timer counting a period in the first DRX cycle to shift from the first DRX cycle to the second DRX cycle,
wherein the at least one hardware transceiver is configured to transmit, to a user equipment (UE) for transferring the UE from the source base station to the target base station, the plurality of configurations,
wherein the first configuration is used for performing, in a state of Radio Resource Control (RRC) connected with the target base station, DRX operation using the first DRX cycle,
wherein the second configuration is used for performing, in a state of RRC connected with the target base station, DRX operation using the second DRX cycle when the UE does not receive data from the second base station until the first timer expires while performing the DRX operation using the first cycle, and
wherein a first length of the first reception-monitoring time and a second length of the second reception-monitoring time are same length, and a third length of the first non-reception-monitoring time is shorter than a fourth length of the second non-reception-monitoring time.

19. The source base station according to claim 18, wherein
the second configuration is used for performing, in a state of RRC connected with the target base station, DRX operation using the second DRX cycle when the UE receive a DRX control signal from the target base station.

20. The source base station according to claim 18, wherein
the DRX operation in RRC Connected state is different from Paging DRX operation in RRC Idle state.

21. The source base station according to claim 18, wherein
the at least one hardware transceiver is configured to send, to the target base station, time that the UE stays in an RRC Connected state at the source base station and a DRX configuration in the source base station.

22. A target base station comprising:
at least one hardware transceiver configured to transmit, to a user equipment (UE) via a source base station for transferring the UE from the source base station to the target base station, a plurality of configurations including:
a first configuration of a first Discontinuous Reception (DRX) cycle which specifies periodic repetition of a first reception-monitoring time followed by a first non-reception-monitoring time,
a second configuration of a second DRX cycle which specifies periodic repetition of a second reception-monitoring time followed by a second non-reception-monitoring time, and
a first timer counting a period in the first DRX cycle to shift from the first DRX cycle to the second DRX cycle,
wherein the at least one hardware transceiver is configured to perform DRX operation using the first DRX cycle with the UE in a state of Radio Resource Control (RRC) connected,
wherein the at least one hardware transceiver is configured to perform the DRX operation using the second DRX cycle with the UE in a state of RRC connected when the UE does not receive data from the target base station until the first timer expires while performing the DRX operation using the first DRX cycle, and wherein a first length of the first reception-monitoring time and a second length of the second reception-monitoring time are same length, and a third length of the first non-reception-monitoring time is shorter than a fourth length of the second non-reception-monitoring time.

23. The target base station according to claim 22, wherein the DRX operation in RRC Connected state is different from Paging DRX operation in RRC Idle state.

24. The target base station according to claim 22, wherein the target base station shifts the DRX operation from using the second DRX cycle to using the first DRX cycle, if the UE received data while performing the DRX operation using the first DRX cycle.

25. The target base station according to claim 22, wherein the at least one hardware transceiver further configured to transmit, to the UE, a DRX control signal and to start, based on the DRX control signal, the second DRX operation using the second DRX cycle.

26. The target base station according to claim 22, wherein the at least one hardware transceiver is configured to receive, from the source base station, time that the UE stays in an RRC Connected state at the source base station and a DRX configuration in the source base station.

* * * * *